United States Patent [19]
Yang

[11] Patent Number: 5,925,963
[45] Date of Patent: Jul. 20, 1999

[54] MAGNETIC CIRCUIT STRUCTURE FOR A DC ELECTRICAL MACHINE HAVING HIGH RESISTANCE TO CROSS MAGNETIC FLUX

[76] Inventor: Tai-Her Yang, No. 32 Lane 29, Taipin St., Si-Hu Town, Dzan-Hwa, Taiwan

[21] Appl. No.: 08/942,700

[22] Filed: Sep. 30, 1997

[51] Int. Cl.[6] .............. H02K 1/12; H02K 1/14; H02K 1/17; H02K 1/00
[52] U.S. Cl. .............. 310/259; 310/254; 310/258; 310/216; 310/89; 310/154
[58] Field of Search .............. 310/186, 216, 310/217, 218, 254, 256, 258, 259, 154, 89

[56] References Cited

U.S. PATENT DOCUMENTS

| | | | |
|---|---|---|---|
| 283,343 | 8/1883 | Houston | 310/254 |
| 1,114,361 | 10/1914 | Howe | 310/218 |
| 2,598,623 | 5/1952 | Vacha | 310/254 |
| 2,903,610 | 9/1959 | Bessiere | 310/254 |
| 4,467,231 | 8/1984 | Biglino | 310/154 |
| 5,043,618 | 8/1991 | Stephenson | 310/216 |
| 5,175,460 | 12/1992 | Ishizuka | 310/154 |

*Primary Examiner*—Clayton LaBalle
*Attorney, Agent, or Firm*—Bacon & Thomas

[57] ABSTRACT

A low armature reacting magnetic circuit includes of an integral combination of magnetic circuit structures, one for each magnetic pole including at least the two main magnetic field poles of the machine, to achieve magnetic flux circuits of two or more poles within an interference-free magnetic flux circuit structure. Such a circuit provides a high magnetic resistance to inhibit the cross magnetic flux associated with the armature, and improves commutation effectiveness. Further efficiencies are achieved through the addition of interpose auxiliary distributed magnetic circuits and commutating poles. Indentations providing through-holes for ventilation and heat dissipation can be made in one or both main magnetic field conducting end structures.

24 Claims, 26 Drawing Sheets

MAGNETIC CIRCUIT STRUCTURE FOR A DC ELECTRICAL MACHINE HAVING HIGH RESISTANCE TO CROSS MAGNETIC FLUX

BACKGROUND OF THE INVENTION

The invention relates generally to electrical devices having an armature and cooperating stator. More specifically, the invention relates to the design of magnetic circuits within motors and generators.

BRIEF SUMMARY OF THE INVENTION

According to the present invention, a low armature reacting magnetic circuit comprised of an integral combination of magnetic circuit structures, one for each magnetic pole including at least the two main magnetic field poles of the machine, to achieve magnetic flux circuits of two or more poles within an interference-free magnetic flux circuit structure. Such a circuit provides a high magnetic resistance to inhibit the cross magnetic flux associated with the armature. This arrangement also improves commutation effectiveness as well.

A better understanding of the invention will be obtained with reference to the following detailed description and the appended drawings.

BRIEF DESCRIPTION OF THE DRAWINGS

With regard to the appended drawings.

DETAILED DESCRIPTION OF THE INVENTION

Figure 1:
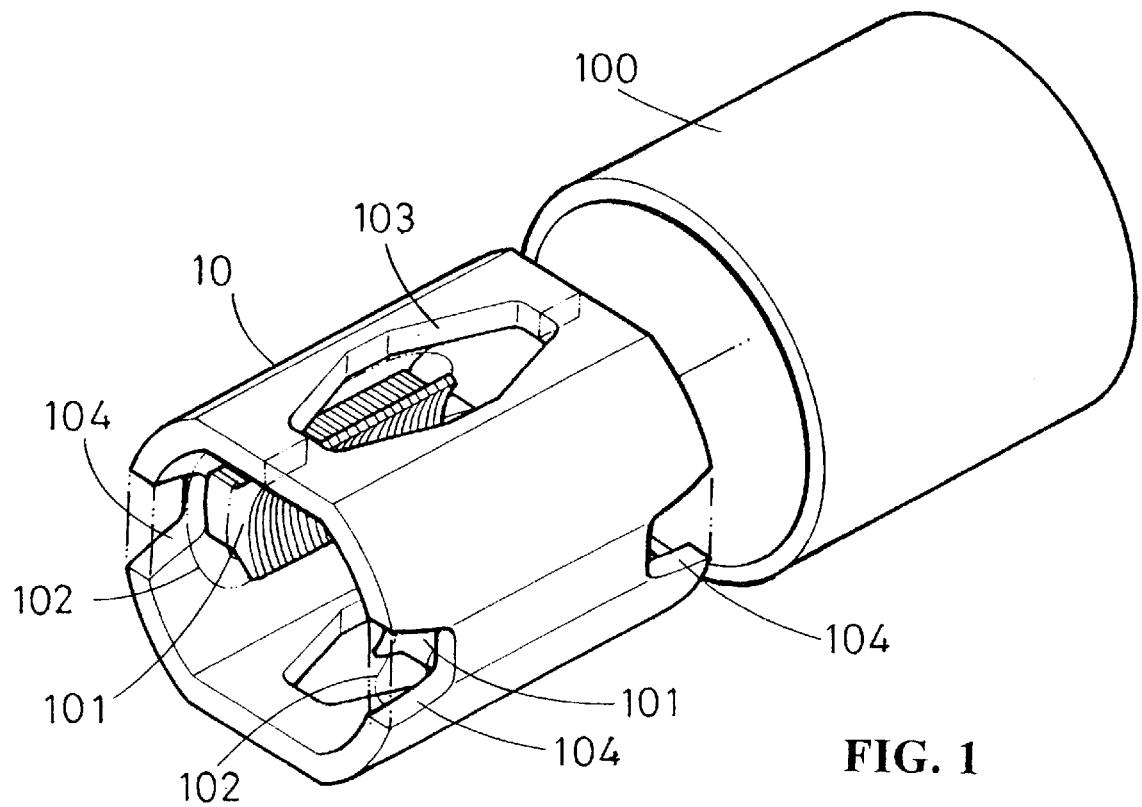
FIG. 1 is an isometric schematic diagram of the embodying example of the invention illustrating that the electrical machine magnetic circuit structure has an aperture defined by side edges tapering toward opposed end walls that are shorter than a central transverse dimension.
Figure 2:
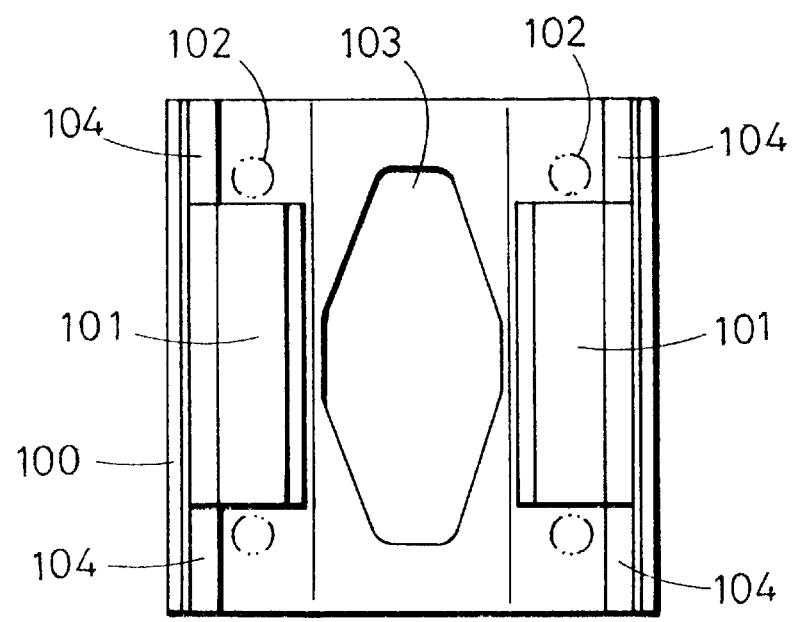
FIG. 2 is a plan sectional view of FIG. 1.

For the conventional DC electric machine operating at high speeds at low magnetic field strength, an increase of armature reacting cross magnetic flux causes an offset of the main field axis, which results in an increase in brush sparking, lower commutation efficiency, and abnormal overheating. With reference to the drawings appended hereto, an isometric view of a two-poled DC electric machine magnetic circuit structure 1, constructed in accordance with the present invention is shown in FIG. 1. While a two-poled arrangement is illustrated and discussed herein for ease of explanation and delineation, the present invention contemplates multi-poled arrangements in general. According to the invention, a low armature reacting magnetic circuit comprised of an integral combination of magnetic circuit structures, one for each magnetic pole, including at least the main magnetic field poles of the machine, achieves a magnetic flux circuit of two or more poles. FIG. 1 is a schematic diagram of a first embodiment of the invention showing that the DC electric machine magnetic circuit structure 1 has a plurality of apertures 103 in its outer periphery, to be described in greater detail below. Apertures 103 are shaped and arranged to inhibit the armature reacting cross magnetic flux. As such, apertures 103 function as magnetic circuit elements which alter the flux path associated with them. FIG. 2 is a plan sectional view of FIG. 1.

Figure 3:
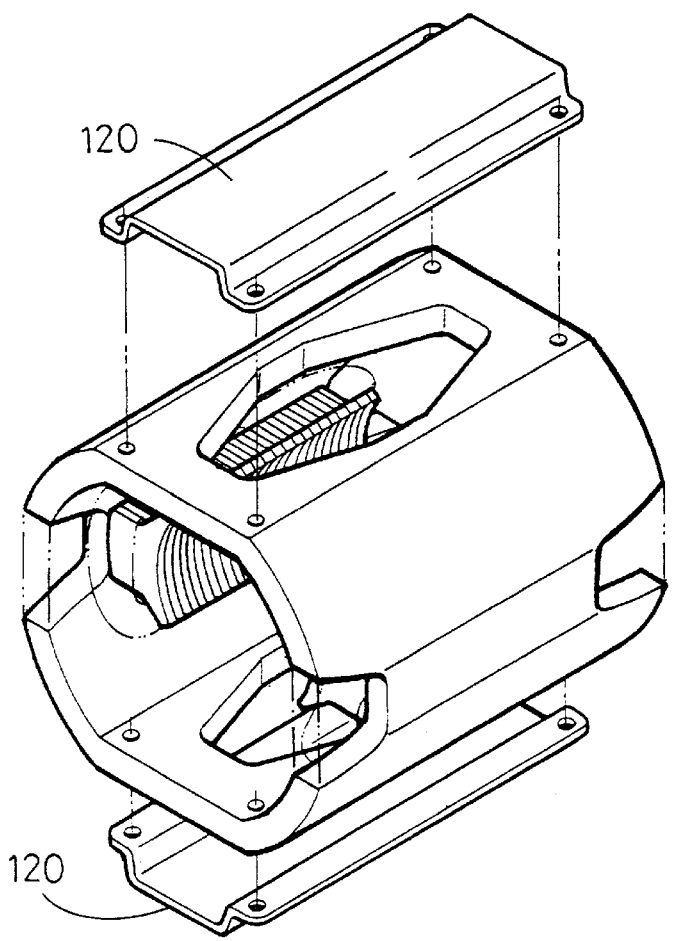
FIG. 3 is an isometric schematic diagram of the invention illustrating that each through hole is separately installed with a sheet type protective cover along an outside periphery.
Figure 4:
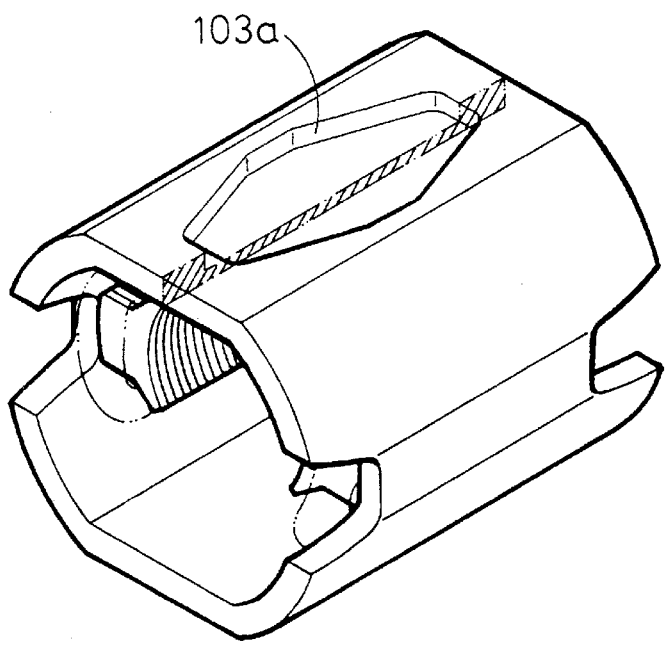
FIG. 4 is an embodying example of the electrical machine magnetic circuit structure in FIG. 1 with a sunken inward blind hole.
Figure 5:
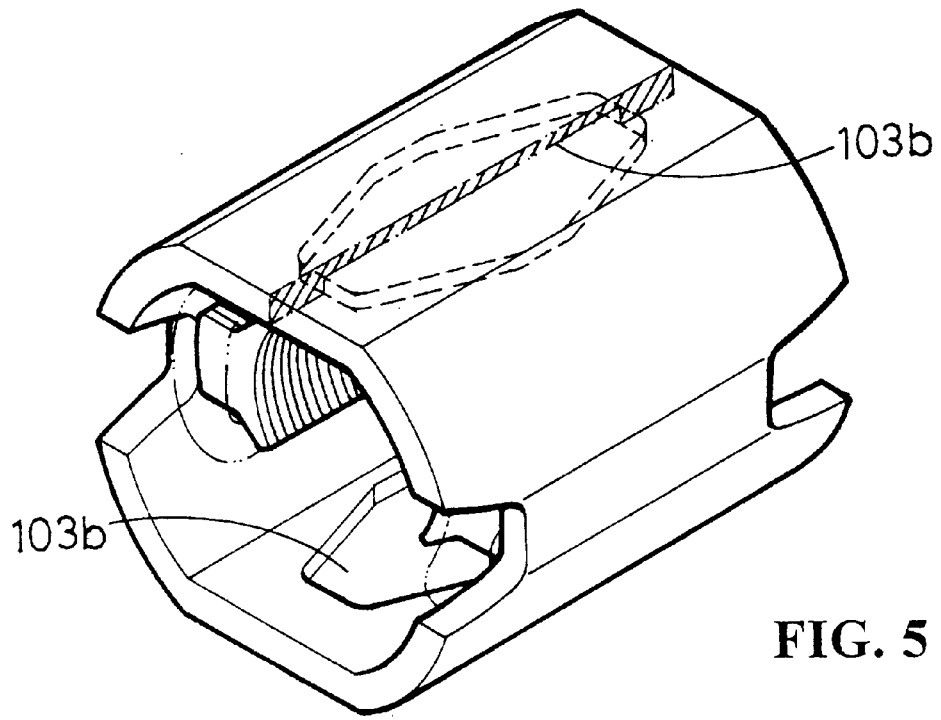
FIG. 5 is an embodying example of the electrical machine magnetic circuit structure with a sunken outward blind hole.
Figure 6:
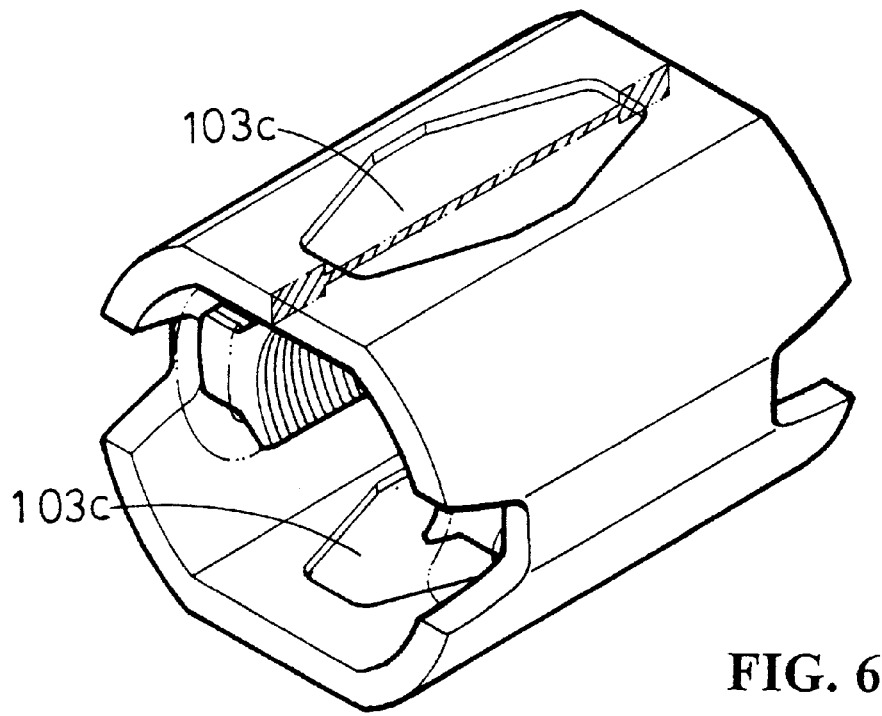
FIG. 6 is an embodying example of the electrical machine magnetic circuit structure with a sunken-both side blind hole.
Figure 48:
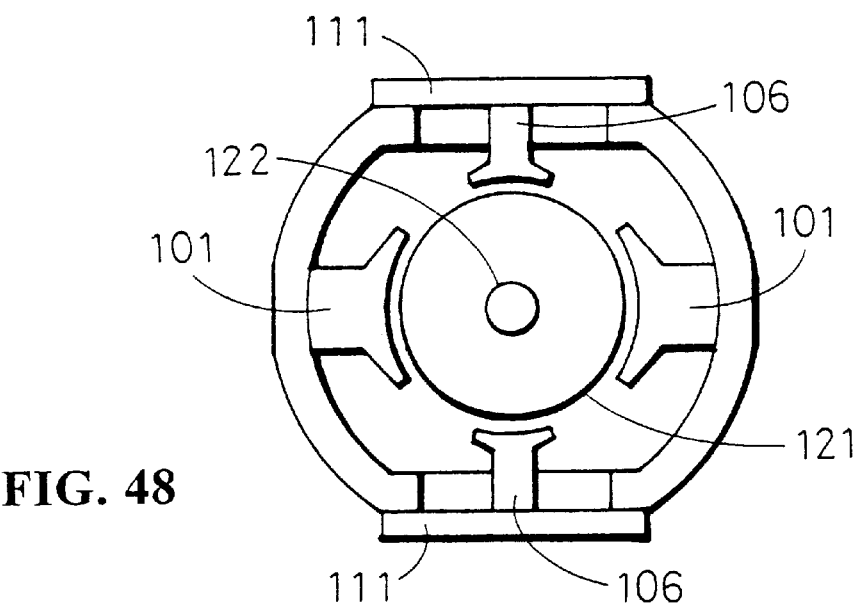
FIG. 48 is the front sectional view schematic diagram of FIG. 47.

The DC electric machine magnetic circuit structure 1 generally has a magnetic circuit shell 10 having a longitudinal dimension within which a rotor 121 rotates on rotational axis parallel to the longitudinal dimension, as shown in FIG. 48, for example. Aperture 103 is elongated, has a maximum central transverse dimension defined to be perpendicular to the longitudinal dimension and is defined by side edges tapering toward opposed end walls that are shorter than said central transverse dimension. FIG. 3 shows aperture 103 as a through-hole. FIG. 4 shows aperture 103a as a blind hole opening into the interior of the structure 10. FIG. 5 shows aperture 103b as a blind hole opening into the exterior of the structure 10. FIG. 6 shows aperture 103c as a blind hole opening into an interior and opening into an exterior of the structure 10.

According to the present invention, the DC electric machine magnetic circuit structure 1 comprises an integral assembly of magnetic circuit structures forming magnetic pole structures 101, including one magnetic pole structure 101 for each magnetic pole, where each pole structure 101 has a specific polarity. Each magnetic pole structure 101 can accept either a permanent magnet or an iron core excited by winding 102. The magnetic circuit structure 1 forms a magnetic field axis ideally in alignment with the rotational axis of the rotating body 121. The cross-sectional area of each interpole magnetic circuit structure 101 is defined by taking the average or the near-average of the magnetic flux field density conducted through the structure. According to the invention, the cross-sectional area of each interpole magnetic circuit structure 101 is arranged to gradually increase in each longitudinal direction along the pole axis from the center of the magnetic circuit structure 1. In further accordance with the invention, a plurality of high magnetic resistance portions defined by the above-described apertures 103, 103a–c are disposed between the magnetic poles.

FIG. 3 is an isometric schematic diagram of the invention illustrating that for each aperture 103, a sheet-type protective cover 120 is mounted on the outer periphery of the structure so that each cover 120 covers an associated aperture. Alternatively, a cover 100 can be arranged to cover the entire structure, including all apertures 103. The protective covers 100 and 120 can be made of either magnetic conducting or non-magnetic conducting material and an air passage can be formed between the protective covers and the magnetic circuit with its through holes to provide the benefit of cooling air flow. If protective covers 100 and 120 are made of magnetic conducting material, they become part of the interpole magnetic circuit or the commutating pole magnetic circuit if commutating poles are installed.

At each end of the magnetic circuit shell 10, corresponding to a magnetic pole axis, is an end shell section having optionally an indent 104 or any of apertures 103, 103a–c in order to reduce weight and to induce heat dissipation as shown in FIG. 1. To aid in heat dissipation, indents 104 can include the installation of a high-efficiency heat conductor, or they can be open or partially open. The shape of the interpole magnetic circuits and the end shell sections is arranged to maintain uniform, or near-uniform distribution of magnetic flux through their cross-sectional area. The interpole magnetic circuits and the magnetic circuit structure can be of a unitary form or can be an assembly of individual components.

In accordance with the principle of increasing the magnetic flux resistance of the armature reacting cross magnetic circuit to inhibit the armature reacting cross magnetic strength, it will be seen that various embodiments of aperture 103 can be selected and inserted into the magnetic circuit with effective results, as described below.

Figure 7:
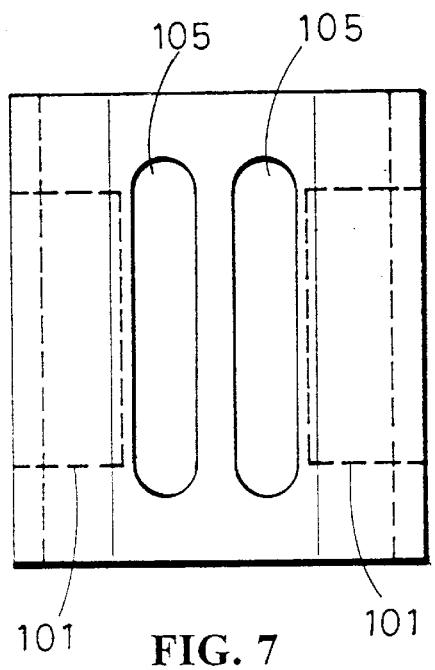
FIG. 7 is a plan sectional view of the embodying example of the invention illustrating that the longitudinal slots of through holes are installed between the field poles to inhibit the armature reacting cross magnetic flux.
Figure 8:
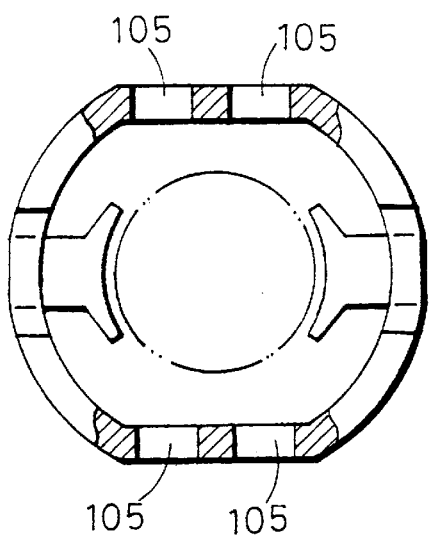
FIG. 8 is the front sectional view schematic diagram of FIG. 7.
Figure 9:
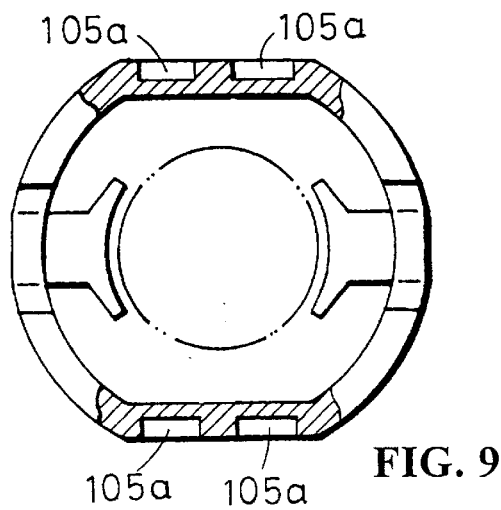
FIG. 9 is a front sectional view schematic diagram of the interpole magnetic circuit structure in FIG. 7 with sunken inward blind holes.
Figure 10:
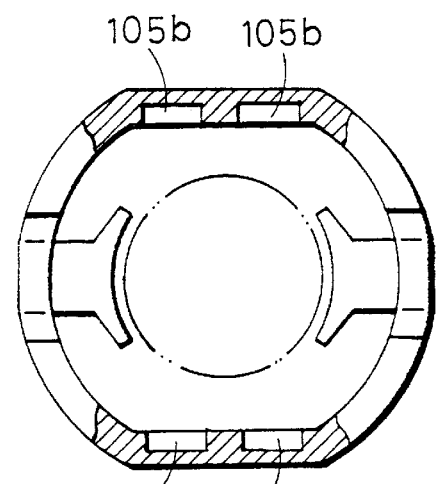
FIG. 10 is a front view section schematic diagram of the interpole magnetic circuit structure in FIG. 7 with sunken outward blind holes.
Figure 11:
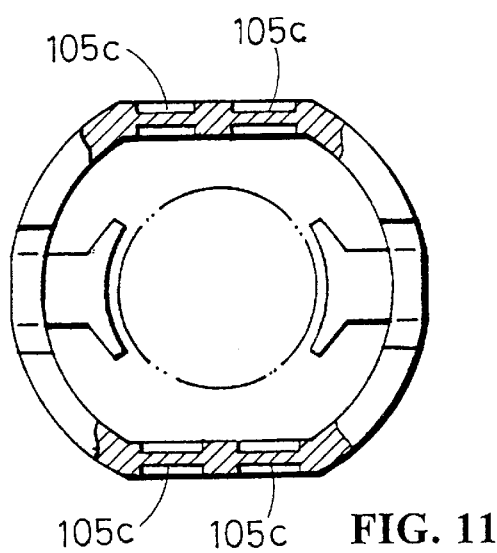
FIG. 11 is a front view section schematic diagram of the interpole magnetic circuit structures in FIG. 7 with sunken-both side blind holes.
Figure 12:
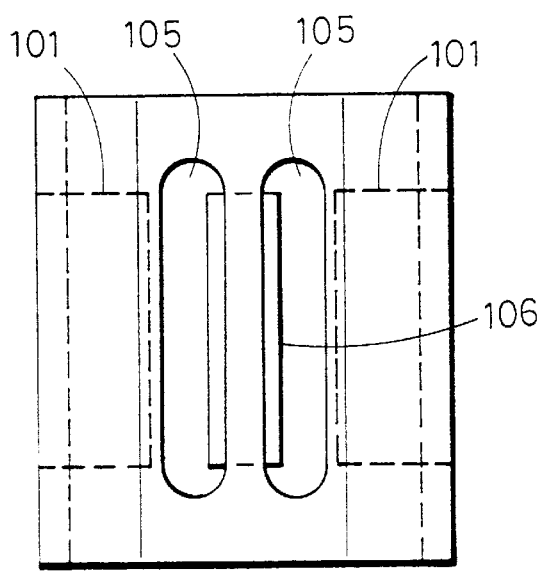
FIG. 12 is a plan sectional view of the embodying example of the invention illustrating that the interpole magnetic circuits are further installed with longitudinal slots of through holes and commutating poles.
Figure 13:
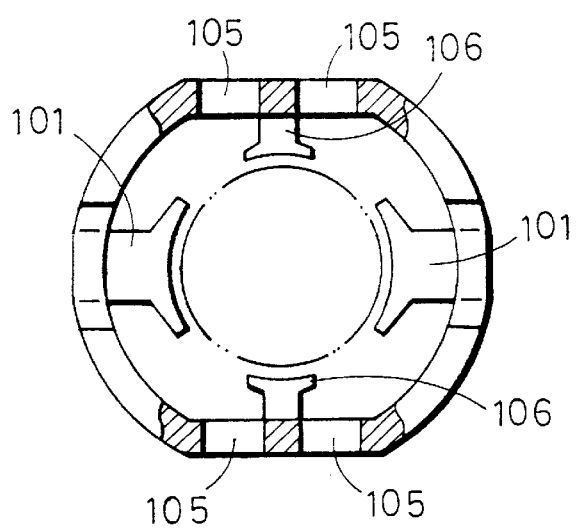
FIG. 13 is a front sectional view schematic diagram of FIG. 12.
Figure 14:
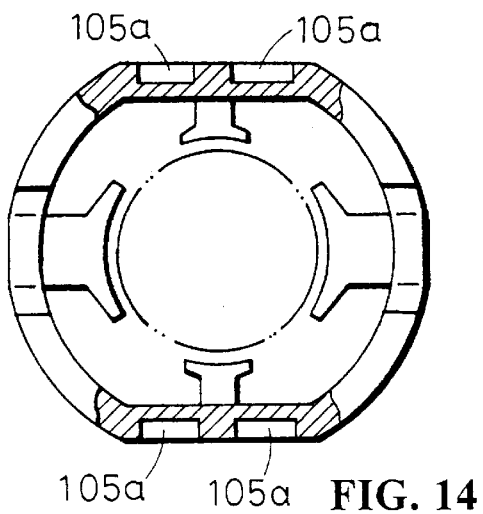
FIG. 14 is a front sectional view schematic diagram of the interpole magnetic circuit-structures in FIG. 12 with sunken inward blind holes.
Figure 15:
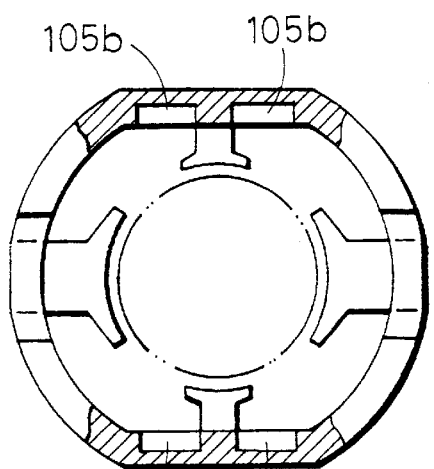
FIG. 15 is a front sectional view schematic diagram of the interpole magnetic circuit structures in FIG. 12 with sunken outward blind holes.
Figure 16:
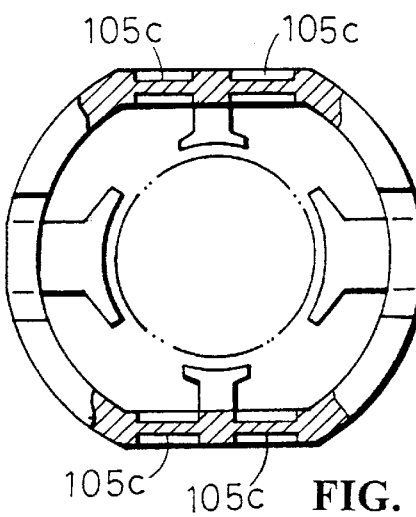
FIG. 16 is a front sectional view schematic diagram of the interpole magnetic circuit structures in FIG. 12 with sunken-both side blind holes.

A second embodiment of the present invention is illustrated in FIGS. 7–11. FIG. 7 is a plan sectional view showing one or more longitudinal slots 105 disposed between the magnetic field poles 101 and parallel to the field pole axis. FIG. 8 is a front sectional view providing of FIG. 7. FIGS. 9–11 are front sectional views showing longitudinal slots 105a–c arranged parallel to the field pole axis. Slots 105, 105a–c are directly analogous in terms of through-hole configuration to apertures 103, 103a–c, respectively. Commutating poles 106 can be installed at the middle electrical angle positions between the main magnetic field poles located at either end in the longitudinal direction of the magnetic circuit structure 1. FIGS. 12–16 correspond to FIGS. 7–11, respectively, showing the relationship between the longitudinal slots 105 and the commutating poles 106.

Figure 17:
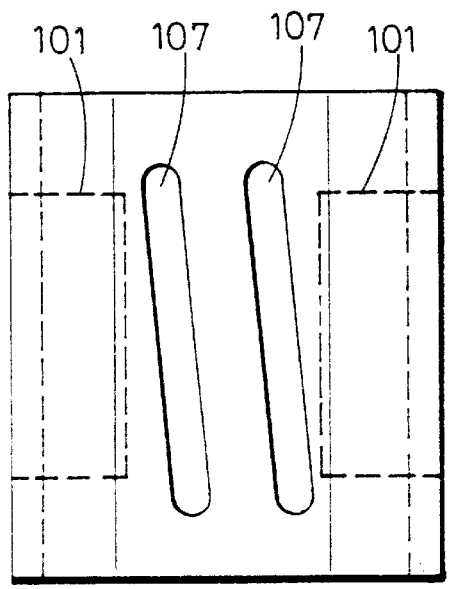
FIG. 17 is a plan view of the embodying example of the invention illustrating that the slanted slots of through holes are installed between the field poles to inhibit the armature reactive cross magnetic flux.
Figure 18:
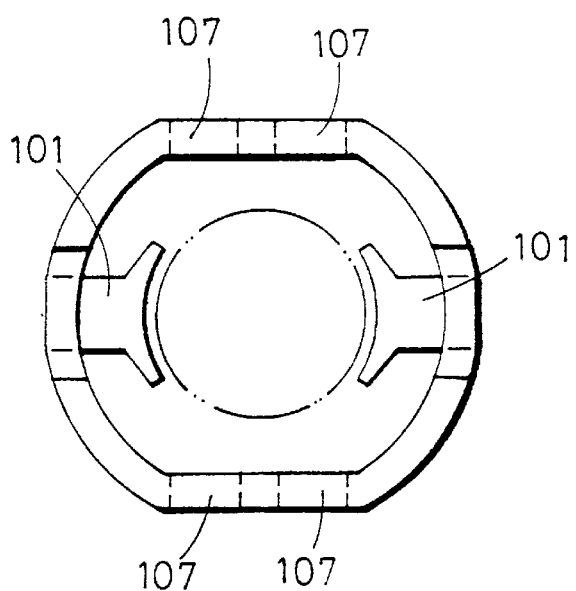
FIG. 18 is the front view of FIG. 17.
Figure 19:
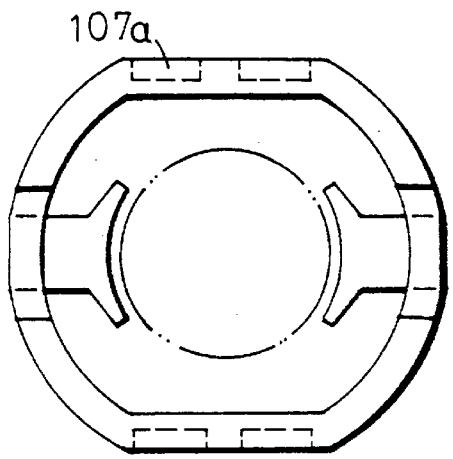
FIG. 19 is the front view of the interpole magnetic circuit structures in FIG. 17 with sunken inward blind holes.
Figure 20:
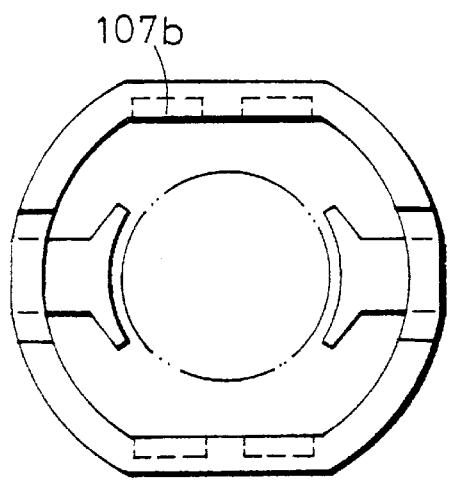
FIG. 20 is the front view of the interpole magnetic circuit structures in FIG. 17 with sunken outward blind holes.
Figure 21:
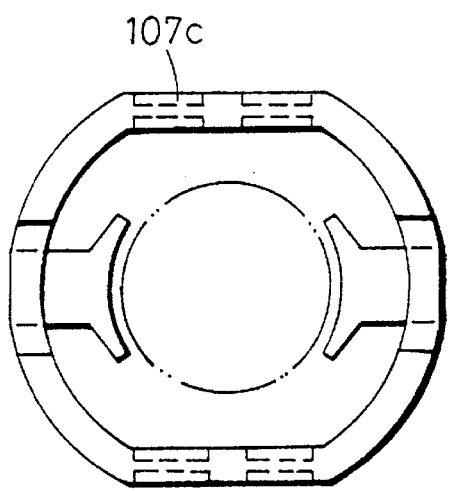
FIG. 21 is the front view of the interpole magnetic circuit structures in FIG. 17 with sunken-both side blind holes.
Figure 24:
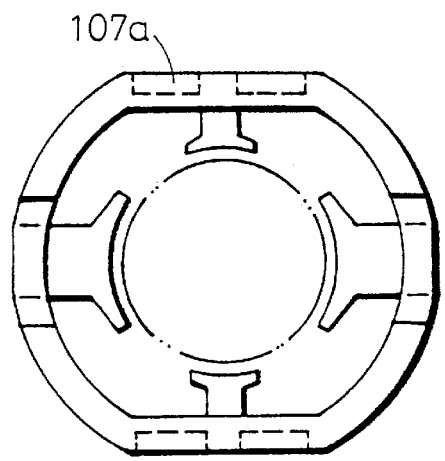
FIG. 24 is the front view of the interpole magnetic circuit structures in FIG. 22 with sunken inward blind holes.
Figure 22:
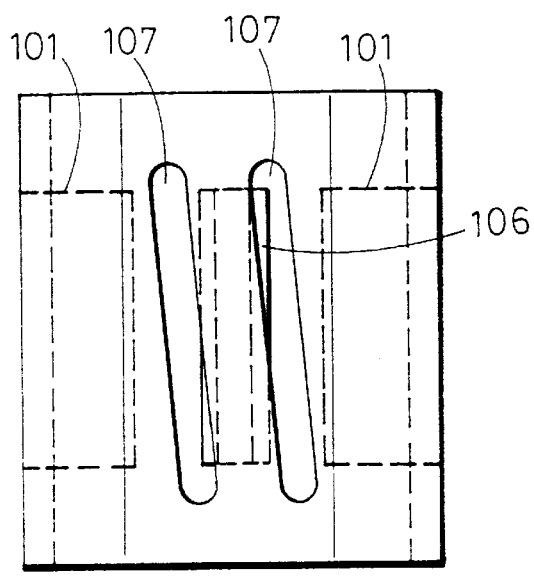
FIG. 22 is a plan sectional view of the embodying example of the invention illustrating that the slanted slots of through holes and commutating poles are further installed.
Figure 25:
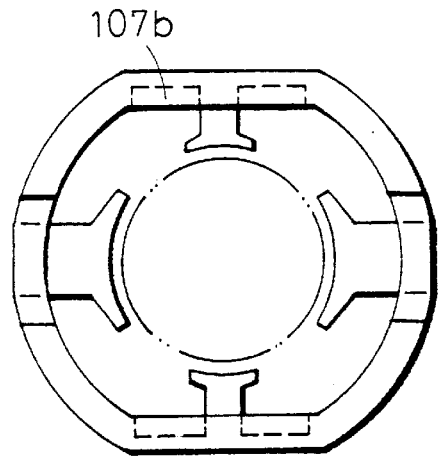
FIG. 25 is the front view of the interpole magnetic circuit structures in FIG. 22 with sunken outward blind holes.
Figure 23:
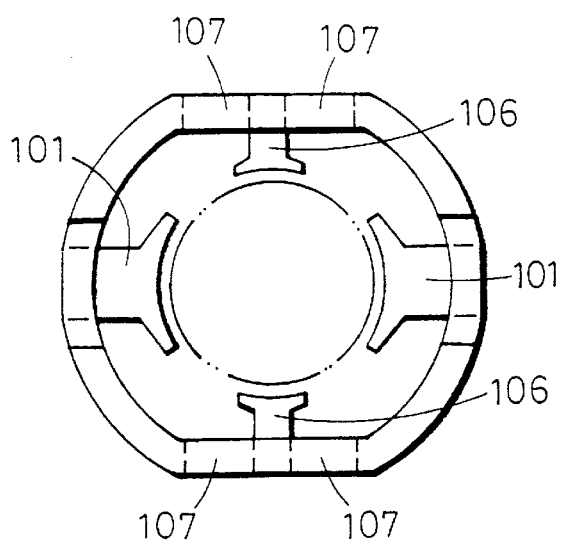
FIG. 23 is the front view of FIG. 22.
Figure 26:
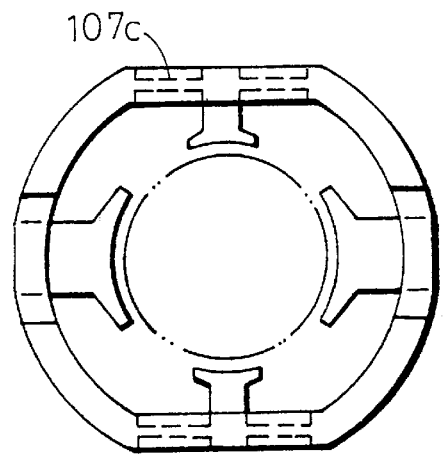
FIG. 26 is the front view of the interpole magnetic circuit structures in FIG. 22 with sunken-both side blind holes.

A third embodiment of the present invention is illustrated in FIGS. 17–21. FIG. 17 shows the longitudinal slots 107 to be slanted toward the main magnetic field axis. Slots 107, 107a–c are directly analogous in terms of through-hole configuration to apertures 103, 103a–c, respectively. Commutating poles 106 can be installed as in the second embodiment. FIGS. 22–26 correspond to FIGS. 17–21, respectively, showing the relationship between the slanted longitudinal slots 107 and the commutating poles 106.

Figure 27:
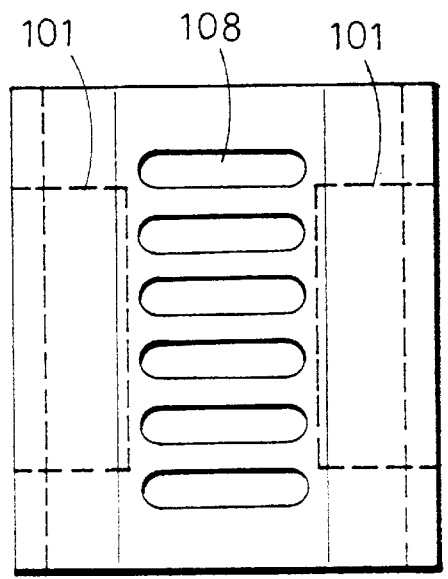
FIG. 27 is a plan sectional view of the embodying example of the invention illustrating that the lateral slats of through holes are installed to inhibit the armature reacting cross magnetic flux.
Figure 28:
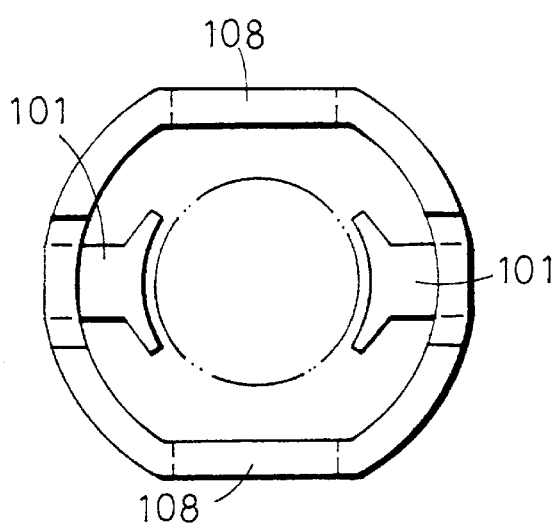
FIG. 28 is the front view of FIG. 27.
Figure 29:
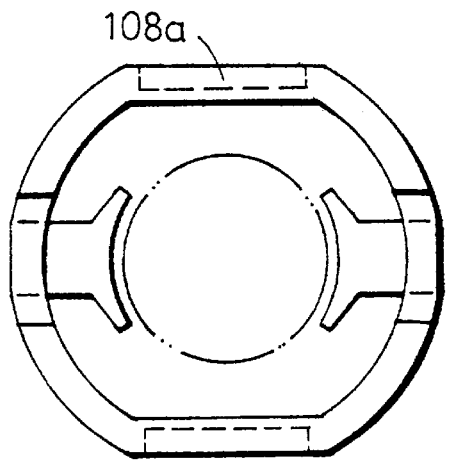
FIG. 29 is the front view of the interpole magnetic circuit structures in FIG. 27 with sunken inward blind holes.
Figure 30:
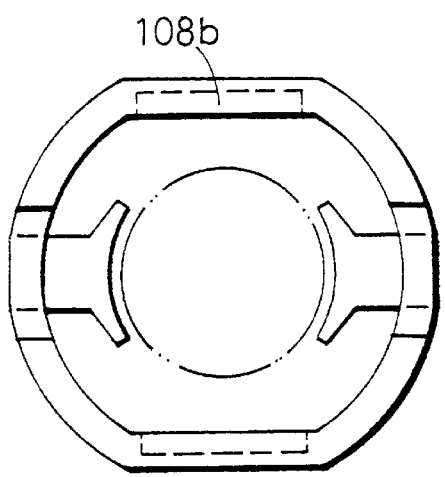
FIG. 30 is the front view of the interpole magnetic circuit structures in FIG. 27 with sunken outward blind holes.
Figure 31:
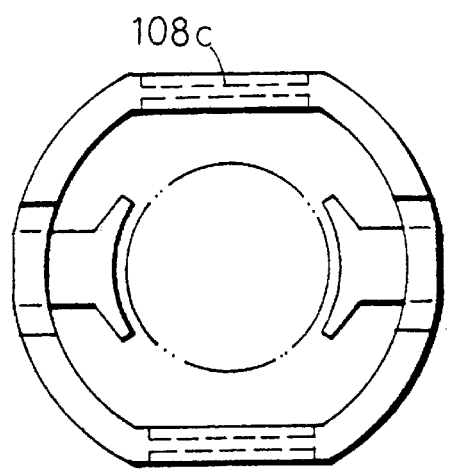
FIG. 31 is the front view of the interpole magnetic circuit structures in FIG. 27 with sunken-both side blind holes.
Figure 34:
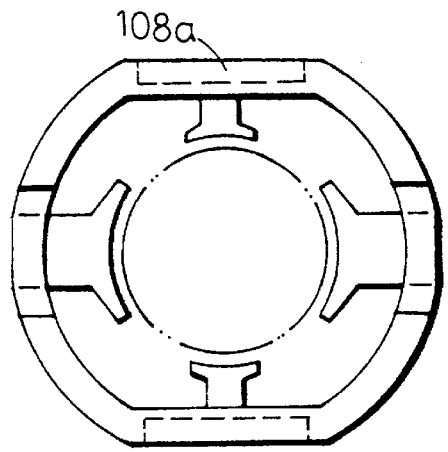
FIG. 34 is the front view of the interpole magnetic circuit structures in FIG. 32 with sunken inward blind holes.
Figure 32:
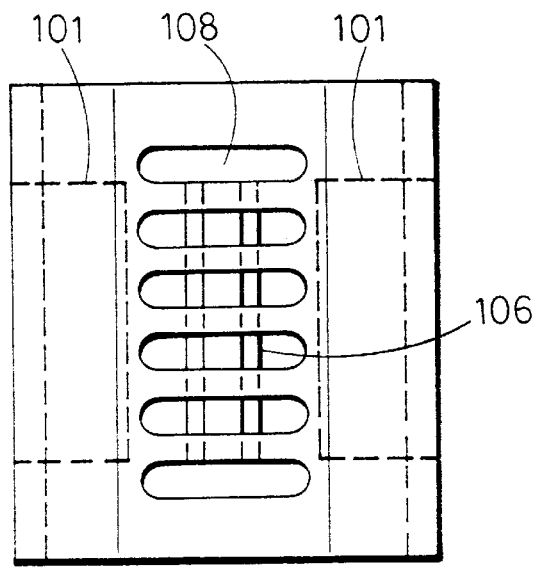
FIG. 32 is a plan sectional view of the embodying example of the invention illustrating that the lateral slots of through holes and commutating poles are further installed.
Figure 35:
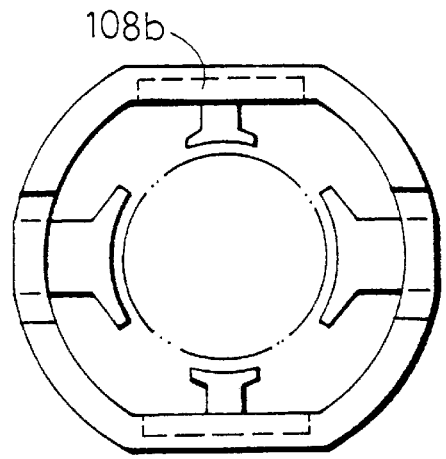
FIG. 35 is the front view of the interpole magnetic circuit structures in FIG. 32 with sunken outward blind holes.
Figure 33:
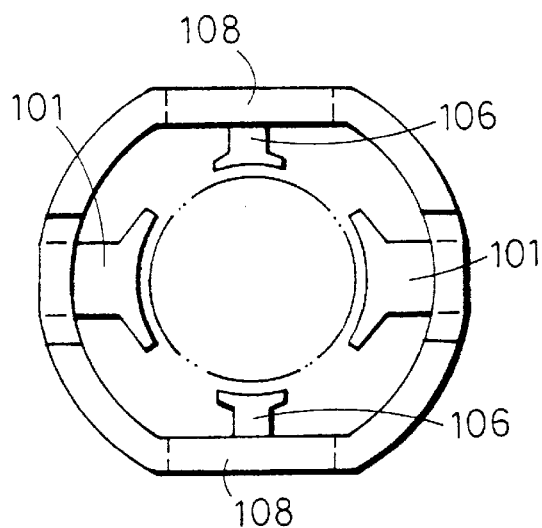
FIG. 33 is the front view of FIG. 32.
Figure 36:
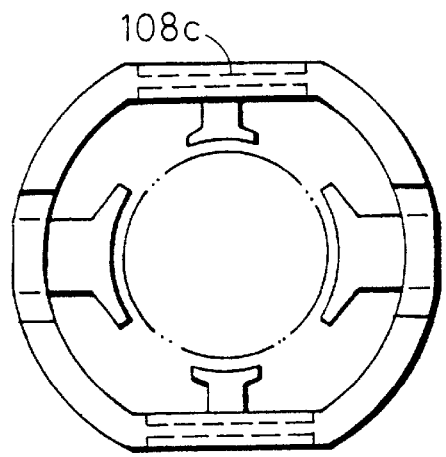
FIG. 36 is the front view of the interpole magnetic circuit structures in FIG. 32 with sunken-both side blind holes.

A fourth embodiment of the present invention is illustrated in FIGS. 27–31. FIG. 27 shows lateral slots 108 perpendicular to the main field axis. Slots 108, 108a–c are directly analogous in terms of through-hole configuration to apertures 103, 103a–c, respectively. Commutating poles 106 can be installed as in the second embodiment. FIGS. 32–36 correspond to FIGS. 27–31, respectively, showing the relationship between the lateral slots 108 and the commutating poles 106.

Figure 37:
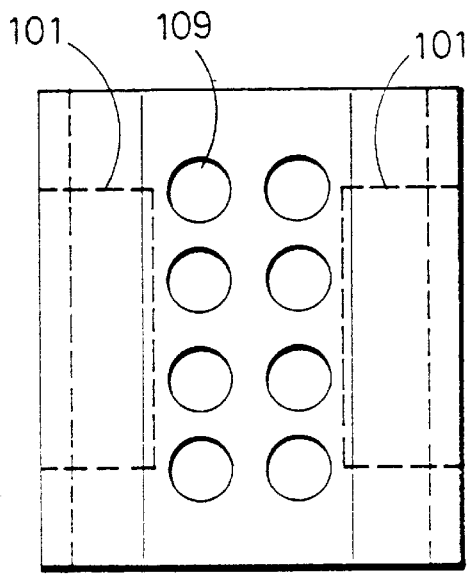
FIG. 37 is a plan sectional view of the embodying example of the invention illustrating that the through round holes are installed to inhibit the armature reacting cross magnetic flux.
Figure 38:
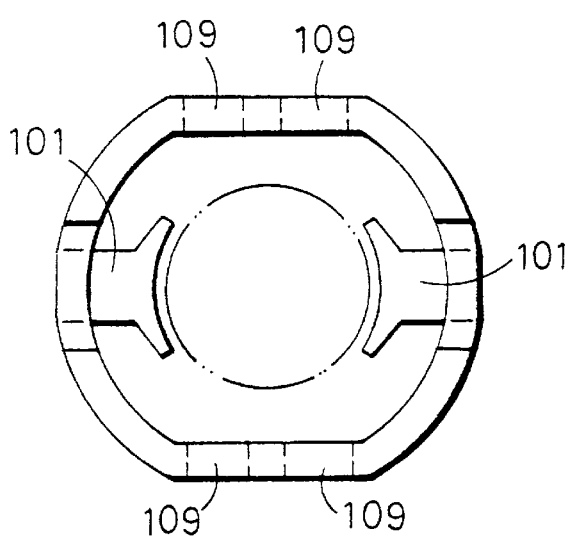
FIG. 38 is the front view of FIG. 37.
Figure 39:
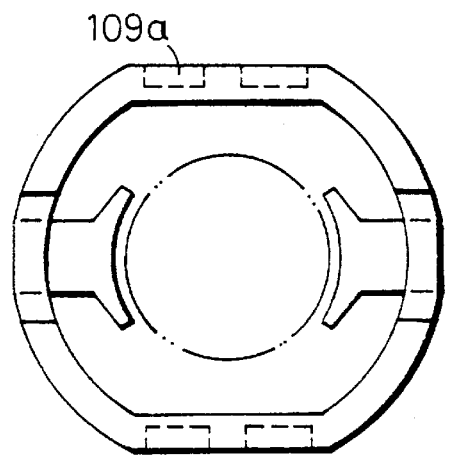
FIG. 39 is the front view of the interpole magnetic circuit structures in FIG. 37 with sunken inward blind holes.
Figure 40:
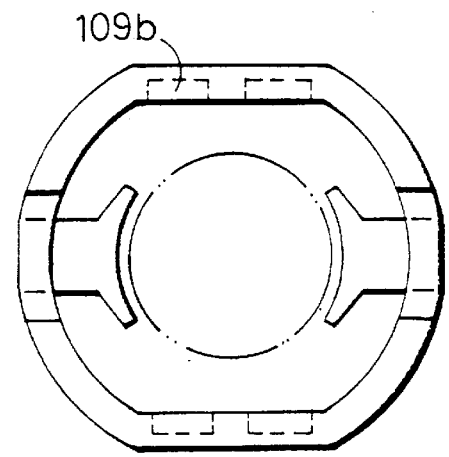
FIG. 40 is the front view of the interpole magnetic circuit structures in FIG. 37 with sunken outward blind hole.
Figure 41:
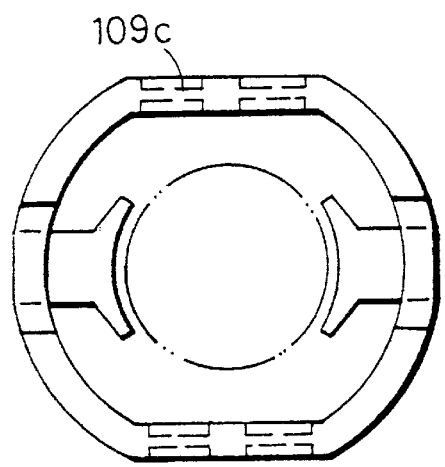
FIG. 41 is the front view of the interpole magnetic circuit structures in FIG. 37 with sunken-both side blind holes.
Figure 44:
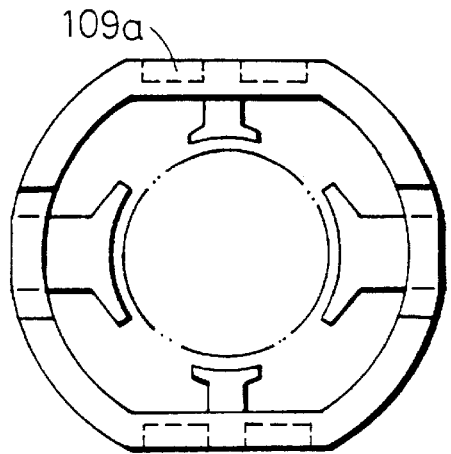
FIG. 44 is the front view of the interpole magnetic circuit structures in FIG. 42 with sunken inward blind holes.
Figure 42:
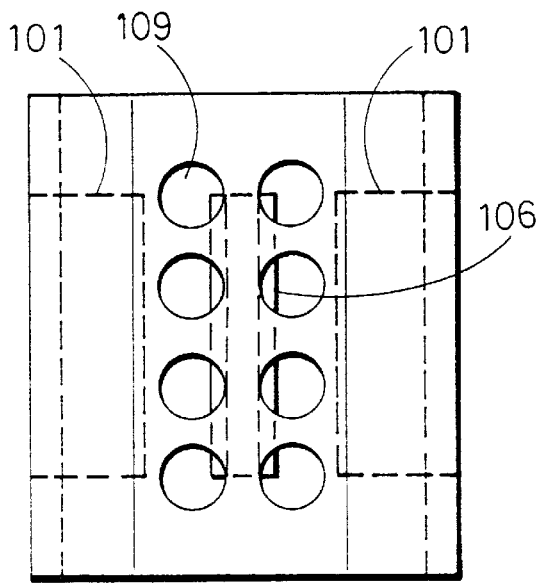
FIG. 42 is a plan sectional view of the embodying example of the invention illustrating that the through round holes and commutating poles are further installed.
Figure 45:
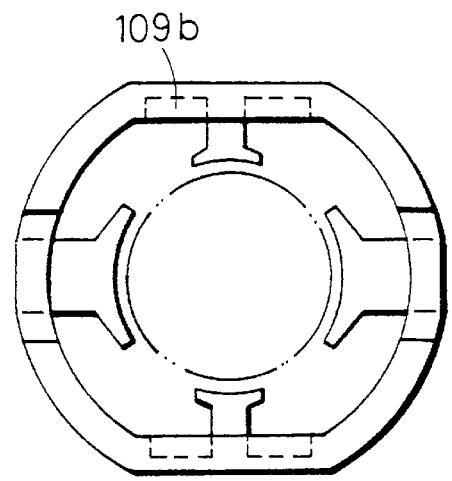
FIG. 45 is the front view of the interpole magnetic circuit structures in FIG. 42 with sunken outward blind holes.
Figure 43:
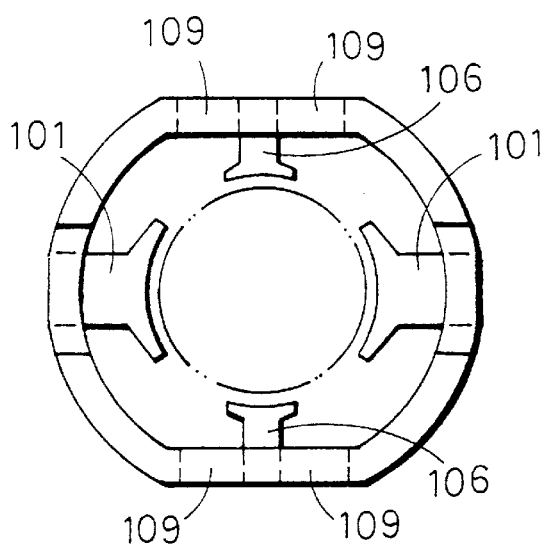
FIG. 43 is the front view of FIG. 42.
Figure 46:
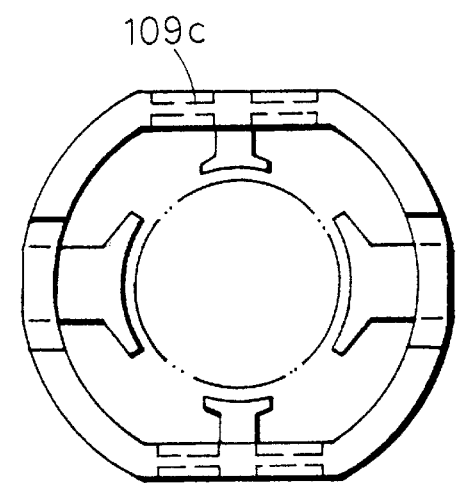
FIG. 46 is the front view of the interpole magnetic circuit structures in FIG. 42 with sunken-both side blind holes.

A fifth embodiment of the present invention is illustrated in FIGS. 37–41. FIG. 37 shows round apertures 109. Holes 109, 109a–c are directly analogous in terms of round aperture configuration to apertures 103, 103a–c, respectively. Commutating poles 106 can be installed as in the second embodiment. FIGS. 38–46 correspond to FIGS. 37–41, respectively, showing the relationship between the round apertures 109 and the commutating poles 106.

Figure 47:
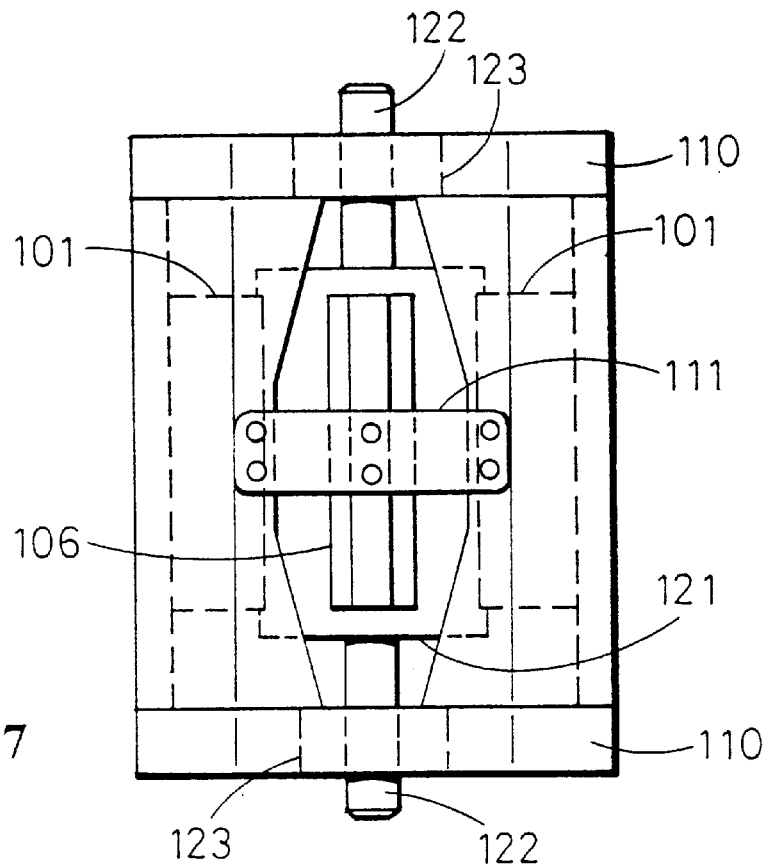
FIG. 47 is a plan sectional view of the first embodying example of the invention illustrating that the magnetic conductive end shell magnetic circuit is installed to constitute the interpole auxiliary distributing magnetic circuit.

A sixth embodiment of the present invention is illustrated in FIGS. 47 and 48. FIG. 47 combines the magnetic conductive end structure 110 and the magnetic conductive shell 10 with one or more interpole auxiliary distributing magnetic circuit components 111, shown to connect magnetic poles 101. FIG. 48 is the front sectional view schematic diagram of FIG. 47, showing the relationship between the magnetic field poles 101, the commutation poles 106, the rotor 121, and the lateral strap interpole auxiliary distributing magnetic circuit component 111. The commutating poles 106 are located between the two magnetic poles, they have different polarities, they face the rotor 121, and they are installed at locations based on the desired electric machine performance, which is governed in part by the location of the magnetic flux-modifying apertures (e.g., 103, 105, or 107, etc.). One or more of the lateral strap auxiliary distributed magnetic circuits 111 are installed on the periphery of the conductive shell 10 between the commutating pole 106 and the main field pole. According to the present invention, the main magnetic flux is conducted through the field pole, the magnetic conductive end shell 110, the corresponding magnetic pole, and the rotor 121, thereby constituting a closed magnetic circuit, while the magnetic flux of the commutating pole 106 is conducted through the lateral strap auxiliary distributed magnetic circuit 111, the magnetic end shell 110, and the corresponding main field pole, thereby constituting a separate closed circuit.

Figure 49:
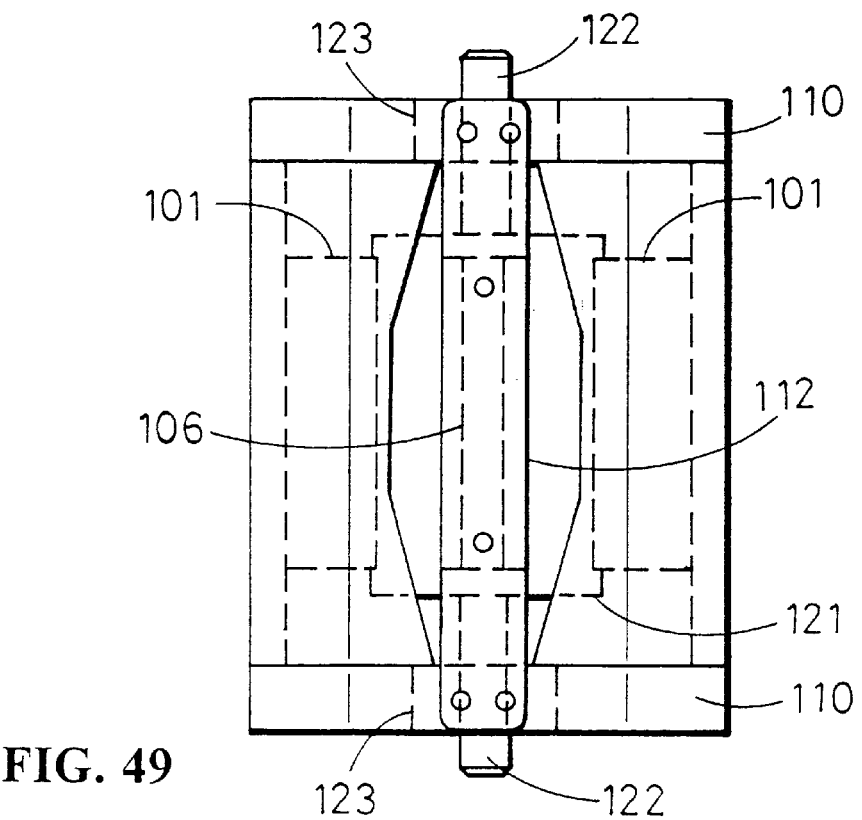
FIG. 49 is a plan sectional view of the second embodying example of the invention illustrating that the magnetic conductive end shell magnetic circuit is installed to constitute the interpole auxiliary distributing magnetic circuit.
Figure 50:
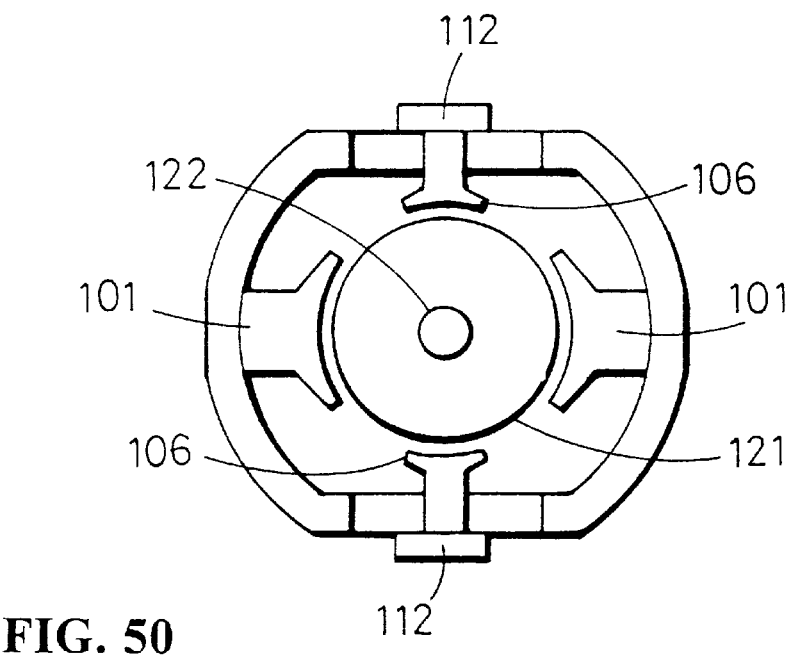
FIG. 50 is the front sectional view schematic diagram of FIG. 49.

A seventh embodiment of the present invention is illustrated in FIGS. 49 and 50. FIG. 49 combines the magnetic conductive end structure 110 and the magnetic conductive shell 10 with one or more axial strap interpole auxiliary distributing magnetic circuit components 112. FIG. 50 is the front sectional view schematic diagram of FIG. 49, showing the relationship between the magnetic field poles 101, the commutation poles 106, the rotor 121, and the axial strap interpole auxiliary distributing magnetic circuit component 112. One or more components 112 are installed parallel to the rotor axis between the commutating pole 106 and the field pole. The commutating poles are located as in the sixth embodiment; the main magnetic flux forms a closed magnetic circuit, as disclosed in the sixth embodiment; and the commutating poles and the axial strap auxiliary distributed magnetic circuit 112 form a separate closed magnetic circuit, in the same way as disclosed in the sixth embodiment.

Figure 51:
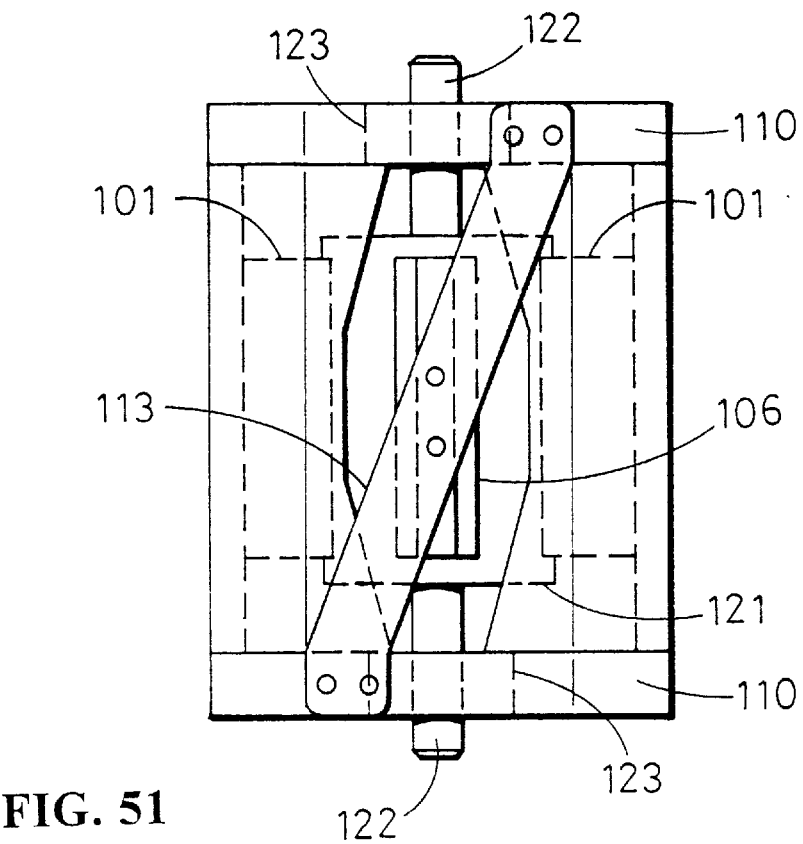
FIG. 51 is a plan sectional view of the third embodying example of the invention illustrating that the magnetic conductive end shell magnetic circuit is installed to constitute the interpole auxiliary distributing magnetic circuit.
Figure 52:
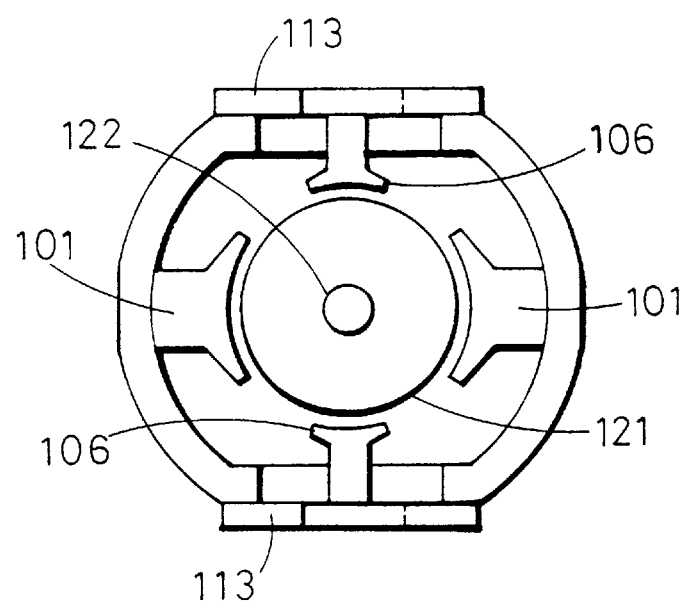
FIG. 52 is the front sectional view schematic diagram of FIG. 51.

A eighth embodiment of the present invention is illustrated in FIGS. 51 and 52. FIG. 51 combines the magnetic conductive end structure 110 and the magnetic conductive shell 10 with one or more diagonal strap interpole auxiliary distributing magnetic circuit components 113. FIG. 52 is the front sectional view schematic diagram of FIG. 51, showing the relationship between the magnetic field poles 101, the commutation poles 106, the rotor 121, the diagonal strap interpole auxiliary distributing magnetic circuit component 113. One or more of the diagonal strap auxiliary distributed magnetic circuits 113 are installed in the same slanted direction or in different slanted directions between the commutating pole 106 and the field pole. The commutating poles are located as in the sixth embodiment; the main magnetic flux forms a closed magnetic circuit, as disclosed in the sixth embodiment; and the commutating poles and the auxiliary distributed magnetic circuit 113 form a separate closed magnetic circuit, in the same way as disclosed in the sixth embodiment. The isolating ring 123 made of non-magnetic conductive material can be installed between the magnetic conductive shell 110 and the rotating shaft 122 of the rotor 121 to prevent the distribution of the magnetic flux through the shaft 122. Alternatively, the rotating shaft 122 can be made of non-magnetic conductive material.

Figure 53:
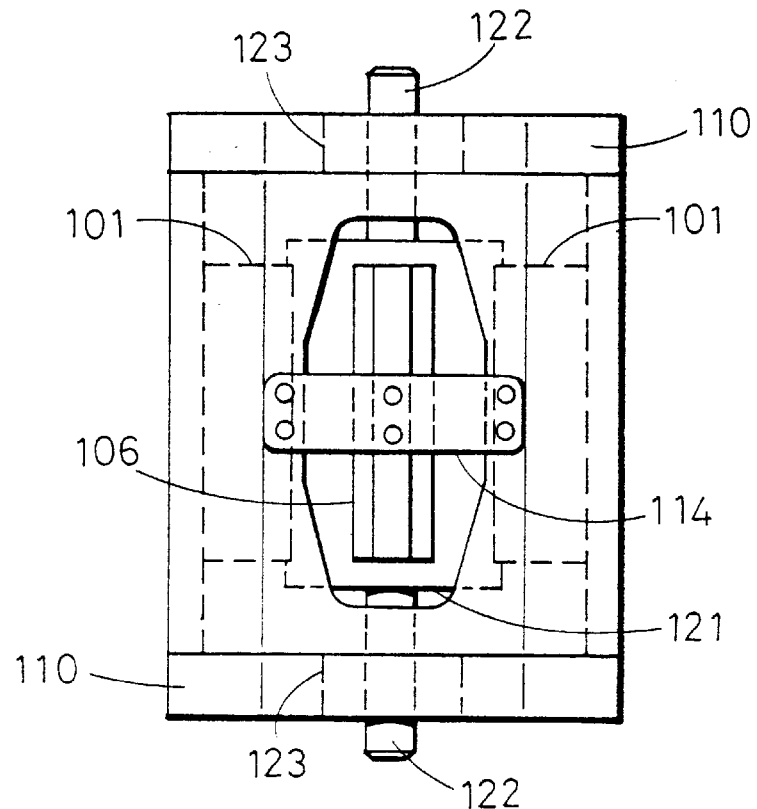
FIG. 53 is a plan sectional view of the fourth embodying example of the invention illustrating that the magnetic conductive end shell magnetic circuit is installed to constitute the interpole auxiliary distributing magnetic circuit.
Figure 54:
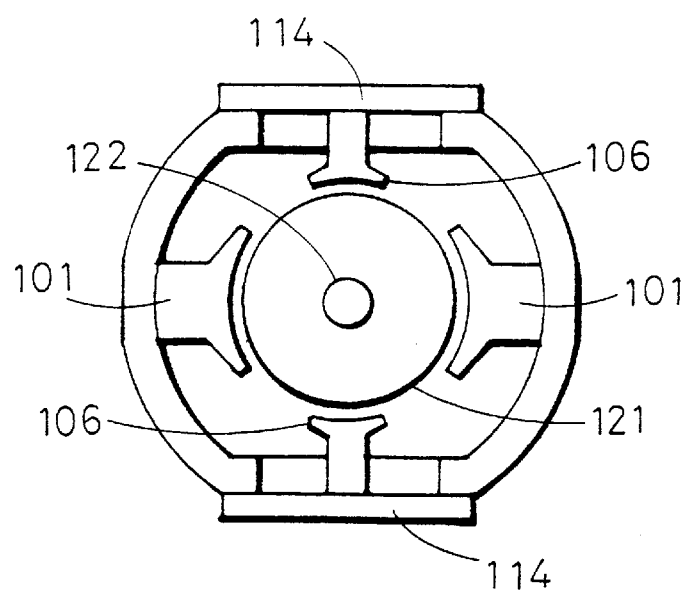
FIG. 54 is the front sectional view schematic diagram of FIG. 53.

A ninth embodiment is illustrated in FIGS. 53 and 54. FIG. 53 is a plan sectional view which combines the magnetic conductive end shell 110 and the magnetic conductive shell 10 with one or more interpole auxiliary distributing magnetic circuit components 114 installed on the periphery of the magnetic shell 10 between the commutating pole and the field pole, and oriented perpendicular to the main field pole axis. FIG. 54 is the front sectional view schematic diagram of FIG. 53, showing the relationship between the magnetic field poles 101, the commutation poles 106, the rotor 121, and the interpole auxiliary distributing magnetic circuit component 114. The commutating poles are located as in the sixth embodiment. The main magnetic flux is through the field pole, partially through the interpole magnetic circuit, partially through the magnetic conductive end shell 110, and then on through the corresponding magnetic pole, thereby constituting a closed magnetic circuit, while the magnetic flux of the commutating pole 106 is through the auxiliary distributed magnetic circuit 114, the magnetic end shell 110, and the corresponding magnetic pole, thereby constituting a separate closed circuit.

Figure 55:
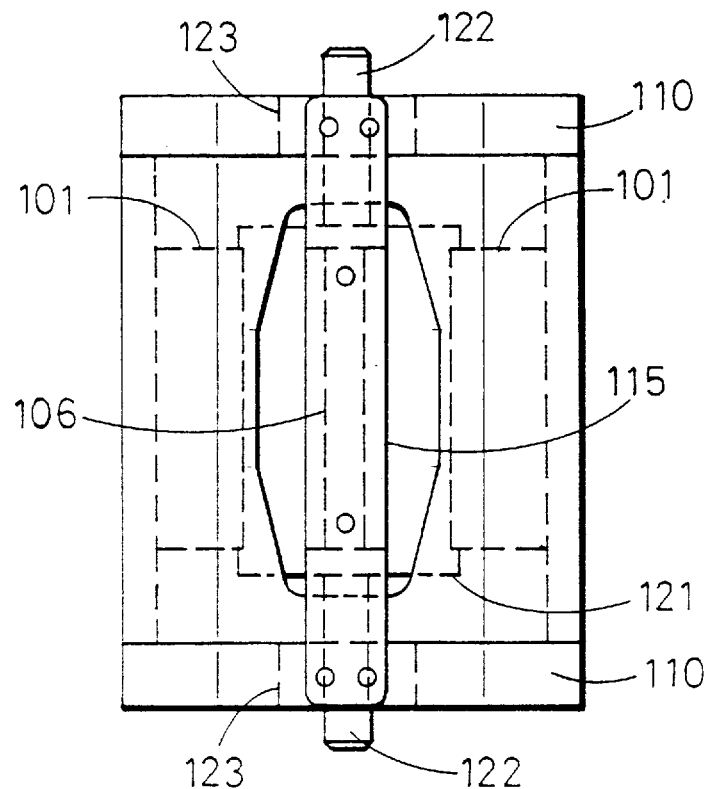
FIG. 55 is a plan sectional view of the fifth embodying example of the invention illustrating that the magnetic conductive end shell magnetic circuit is installed to constitute the interpole auxiliary distributing magnetic circuit.
Figure 56:
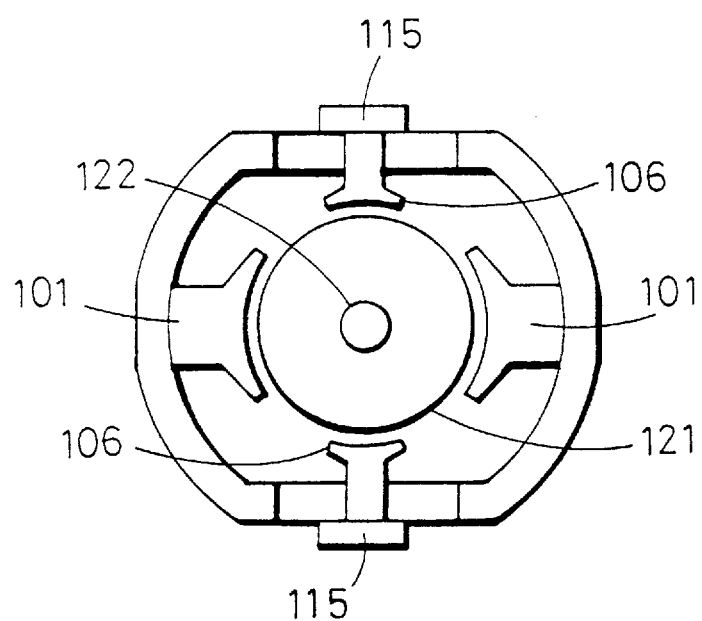
FIG. 56 is the front sectional view schematic diagram of FIG. 55.

A tenth embodiment of the present invention is illustrated in FIGS. 55 and 56. FIG. 55 is a plan sectional view illustrating that the magnetic conductive end shell magnetic circuit is installed to function as the interpole auxiliary distributing magnetic circuit. FIG. 56 is the front sectional view schematic diagram of FIG. 55 showing the relationship between the magnetic field poles 101, the commutation poles 106, the rotor 121, and the parallel strap interpole auxiliary distributing magnetic circuit components 115 installed parallel to the rotor axis between the commutating pole and the field pole. The main magnetic flux is through the field pole, partially through the interpole magnetic circuit, partially through the magnetic conductive end shell 110, and then on through the corresponding magnetic pole, thereby constituting a closed magnetic circuit. The magnetic flux of the commutating pole 106 is through the parallel strap auxiliary distributed magnetic circuit 115, the magnetic end shell 110, and the corresponding magnetic pole to constitute a closed circuit.

Figure 57:
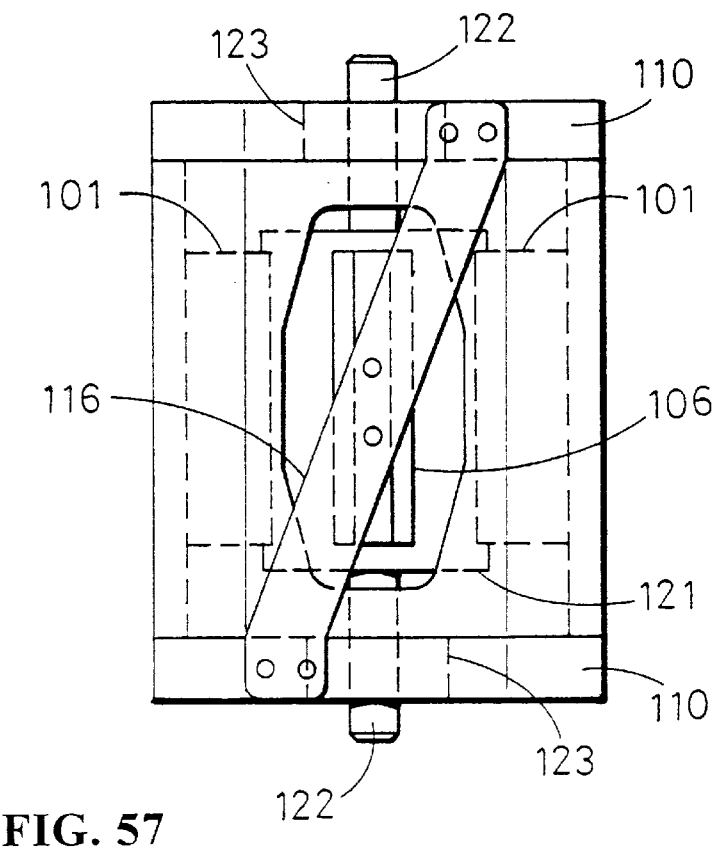
FIG. 57 is a plan sectional view of the sixth embodying example of the invention illustrating that the magnetic conductive end shell magnetic circuit is installed to constitute the interpole auxiliary distributing magnetic circuit.
Figure 58:
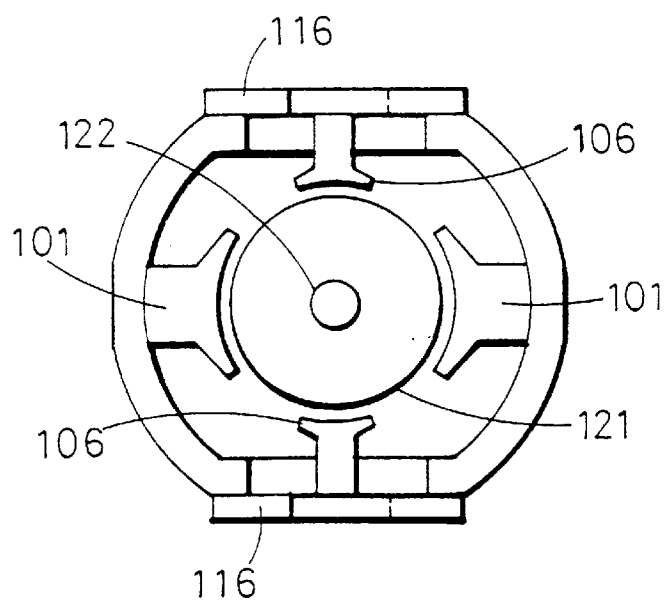
FIG. 58 is the front sectional view schematic diagram of FIG. 57.

An eleventh embodiment is illustrated in FIGS. 57 and 58. FIG. 57 is a plan sectional view illustrating that the magnetic conductive end shell magnetic circuit is installed to form the interpole auxiliary distributing magnetic circuit. FIG. 58 is the front sectional view schematic diagram of FIG. 57, showing the relationship between the magnetic field poles 101, the commutation poles 106, the rotor 121, the interpole auxiliary distributing magnetic circuit component 116. The commutation poles 106 are disposed as disclosed in the sixth embodiment. One or more auxiliary distributed magnetic circuits 116 are installed in the same slanted direction or in different slanted directions between the commutating pole and the field pole. FIG. 58 is the front sectional view schematic diagram of FIG. 57, showing the relationship between the magnetic field poles 101, the commutation poles 106, the rotor 121, and the interpole auxiliary distributing magnetic circuit component 116. One or more auxiliary distributed magnetic circuits 112 and/or 114 can be installed in conjunction with circuit 116. The main magnetic field flux is through the field pole, partially through the interpole magnetic circuit, partially through the magnetic conductive end shell 110 and then into the corresponding magnetic pole, thereby constituting a closed magnetic circuit, while the magnetic flux of the commutating pole 106 is through the auxiliary distributed magnetic circuit 114, magnetic conductive shell 110, and corresponding magnetic pole to constitute a closed circuit.

Figure 59:
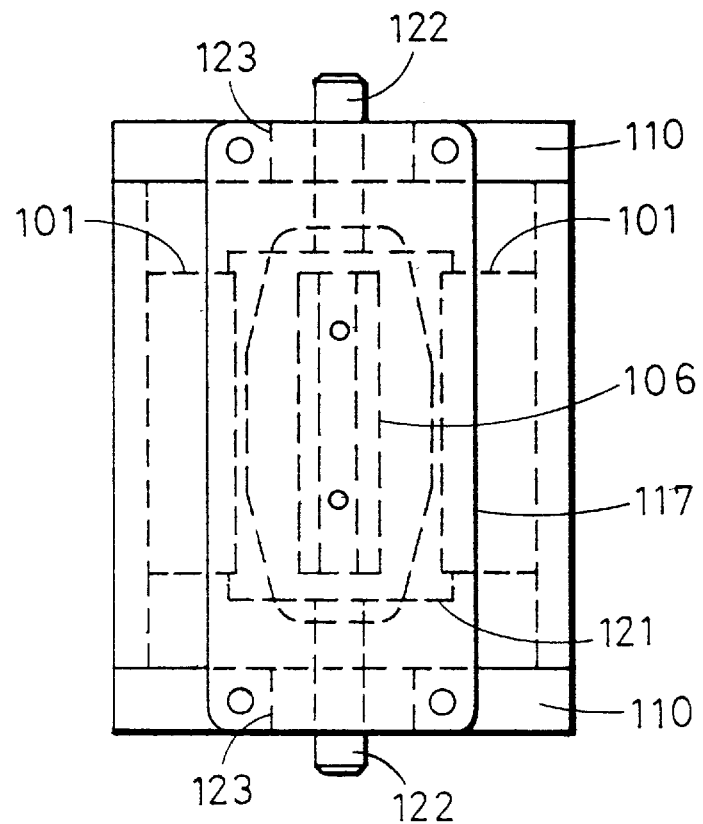
FIG. 59 is a plan sectional view of the embodying example illustrating that the magnetic conductive end shell magnetic circuits are installed to combine with the ring installed closed interpole magnetic circuits of the invention.
Figure 60:
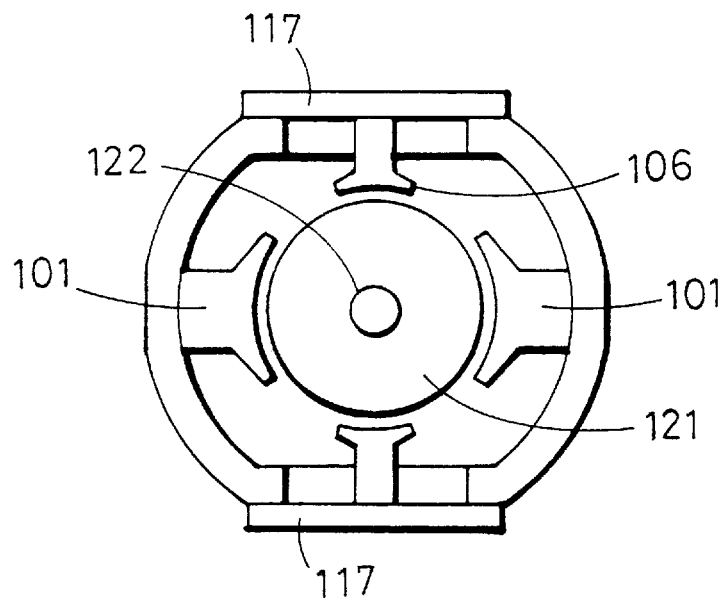
FIG. 60 is the front sectional view schematic diagram of FIG. 59.

A twelfth embodiment of the present invention is illustrated in FIGS. 59 and 60. FIG. 59 is a plan sectional view illustrating that the magnetic conductive end shell 110 are installed to combine with the peripherally installed closed interpole auxiliary distributing magnetic circuits 117 of the invention. FIG. 60 is the front sectional view schematic diagram of FIG. 59, showing the relationship between the magnetic field poles 101, the commutation poles 106, the rotor 121, and the interpole auxiliary distributing magnetic circuit components 117 installed parallel to the rotor axis between the commutating pole and the field pole. The commutation poles 106 are disposed as disclosed in the sixth embodiment. One or more circuits 114 and/or 116 can be installed in conjunction with circuit 117. The magnetic conductive capacity is smaller than the magnetic flux of the main magnetic pole. The magnetic flux path will be the same as in the eighth embodiment. An isolating ring 123 can be added as in the eighth embodiment.

It is well known that the operational characteristics and efficiency of a DC electrical machine magnetic circuit structure which includes a rotor will be affected by the air clearance between the rotor and the magnetic pole surface. Therefore, for the embodiments shown in FIGS. 1–60, the design principles of the air clearance between the rotor and magnetic pole surface are the same as for the conventional electric machine. In all such machines, the magnetic coupling extends longitudinally along the rotor axis, in an air clearance between the rotor and field poles. The traditional configuration is an equal clearance. However, according to the present invention, a more uniform magnetic flux distribution can be achieved if the clearance gradually increases or decreases longitudinally outwardly from the center of the rotor. This can be accomplished by an increase or decrease in rotor diameter, in the magnetic pole surface, or in both.

Figure 61:
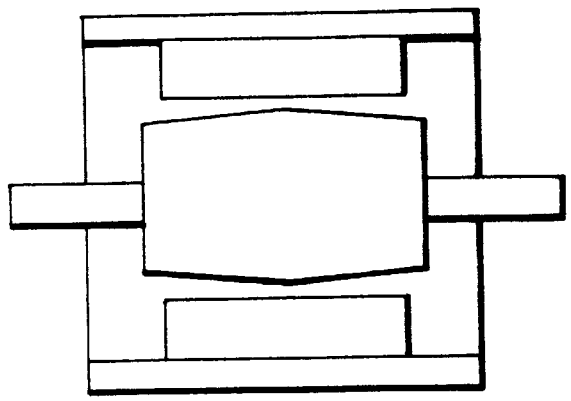
FIG. 61 is the first embodying example of the invention illustrating that the air clearance is gradually increased along the axial direction and is extended in both directions.

FIG. 61 shows a thirteenth embodiment in which the air clearance gradually increases longitudinally outwardly from the center of the rotor. In FIG. 61, the magnetic pole surface has a uniform diameter throughout its axial length, while the rotor diameter is decreased from the rotor center toward each rotor end.

Figure 62:
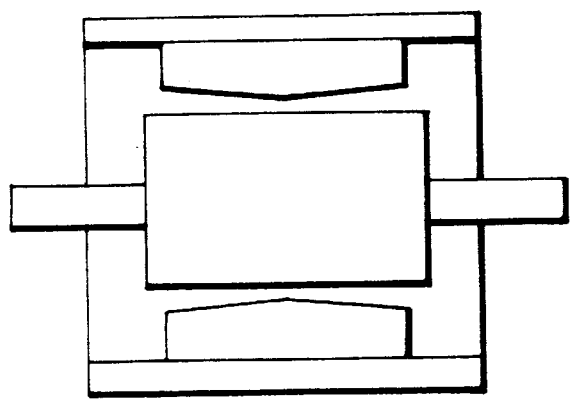
FIG. 62 is the second embodying example of the invention illustrating that the air clearance is gradually increased along the axial direction and is extended in both directions.
Figure 63:
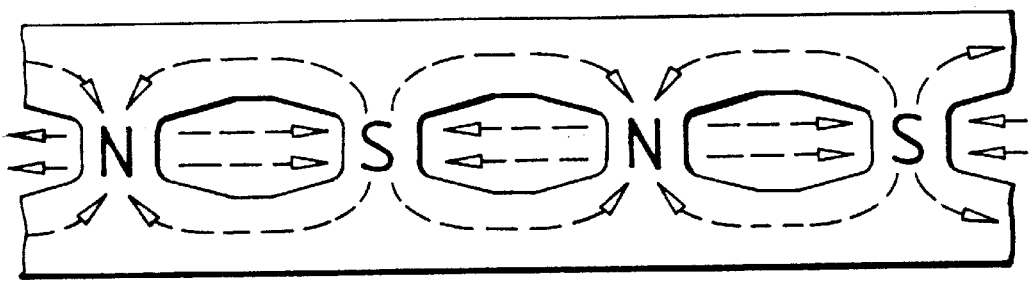
FIG. 63 is a schematic diagram of the invention illustrating a linear field magnetic circuit structure.

FIG. 62 shows a fourteenth embodiment in which the air clearance gradually increases longitudinally outwardly from the center of the rotor. In FIG. 63, the magnetic pole surface diameter is increased from the rotor center toward each rotor end, while the rotor diameter is has a uniform diameter throughout its axial length.

In practical applications, the inside diameter of the magnetic pole and the rotor diameter can be changed simultaneously to allow the air clearance between the rotor and magnetic poles to gradually increase longitudinally outwardly from the center of the rotor.

Applications of the present invention are similar to conventional electric machines, including both internal external rotor types. As in conventional machines, internal rotors with a field winding utilize conducting rings and brushes to conduct the current.

The structures of FIGS. 1–62 can be applied to linear electric machine structures, wherein their structure can be deemed to be an extension of a multi-pole and large diameter rotational devices. FIG. 63 is a schematic diagram of the present invention illustrating a linear magnetic field circuit structure, where, as in the above applications, the interpole section can be provided with through holes, blind holes, longitudinal or slanted slots, and can be installed with commutating poles.

Figure 64:
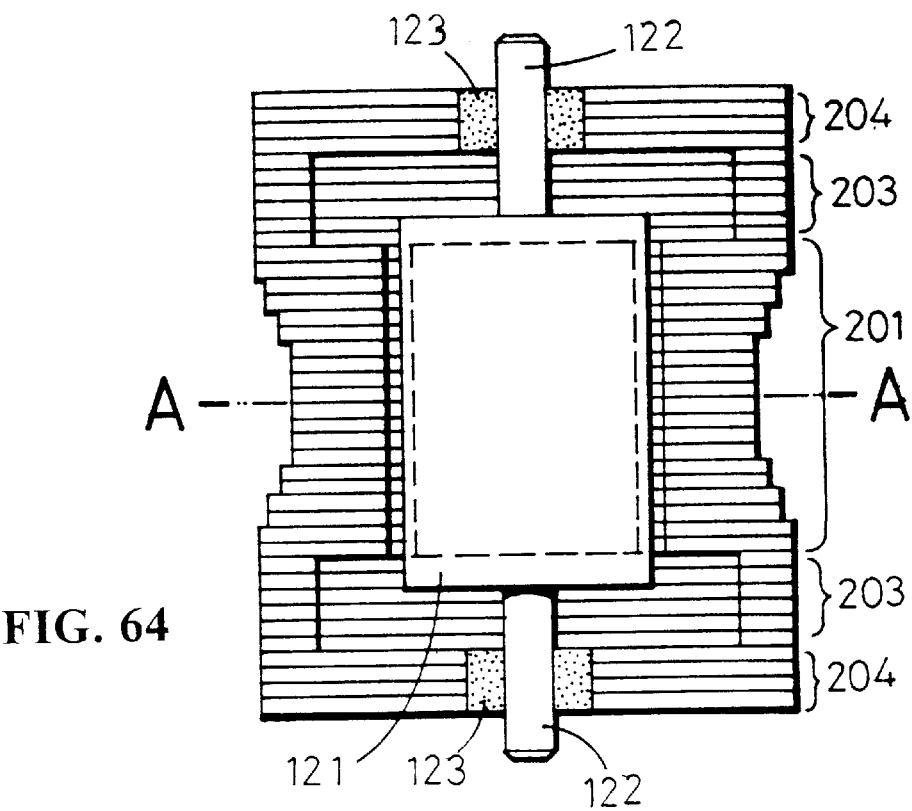
FIG. 64 is a plan sectional view of the embodying example of the invention illustrating that the field magnetic circuits are constituted by the axial lamination of the magnetic conducting sheets in different diameters.

Applications of the above electric machine structures include the series excited, shunt excited, or compound excited DC brushed motors or generators, or the DC brushless or brushed motors or generators with permanent magnet field and winding excited type commutating poles, wherein the commutating winding of the commutating pole is in series combination with the armature and its field polarity relationship is determined according to the operating direction and its role functions as a motor or generator. In addition, its mechanical embodiments can further include the application range of the outside rotational or inside rotational type or double-acting type cylinder shaped or cone shaped or disk shaped rotational electric structure with two or more than two poles based on the same principles of electric machine characteristics or the liner driven electric machines. These configurations can be achieved by integrally forming or assembling laminated magnetic conductive components. Alternatively, only the magnetic pole portions are laminated magnetic conductive material while the rest of the magnetic circuits are in block shaped structures. Embodiments exemplifying the design of a magnetic circuit structure to be completely or partially limited by magnetic conductive material according to the present invention are described below:

FIG. 64 is a plan sectional view of an example embodiment of the invention having a rotor 121 and a rotor shaft 122 forming a longitudinal axis of the electric machine. FIG. 64 illustrates magnetic field circuits formed by the axial lamination of the magnetic conducting sheets of differing lateral widths, as described in detail, below.

Figure 65:
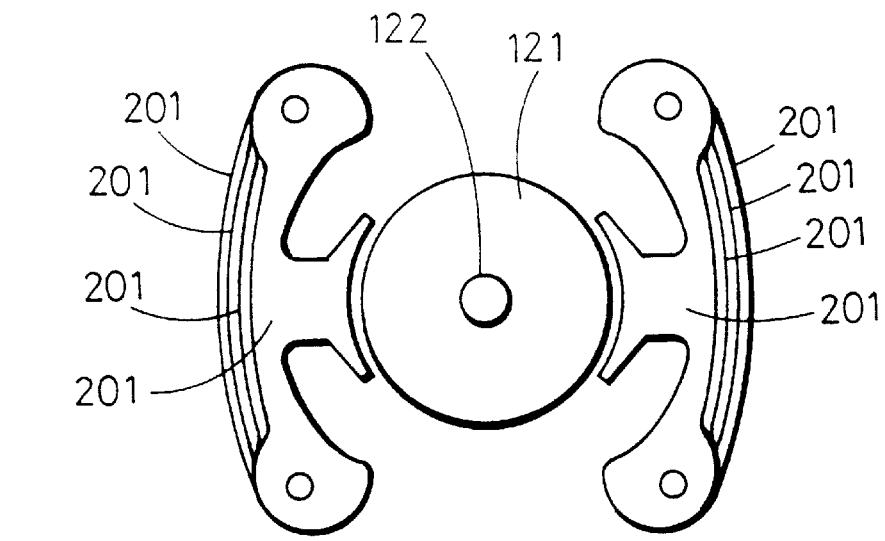
FIG. 65 is the A—A section view of FIG. 64.
Figure 66:
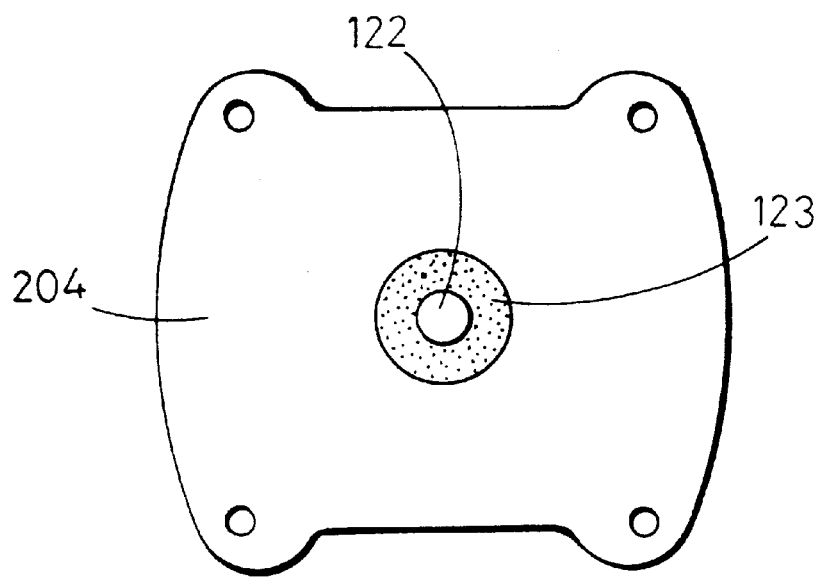
FIG. 66 is the front view of the end shell in FIG. 64.
Figure 67:
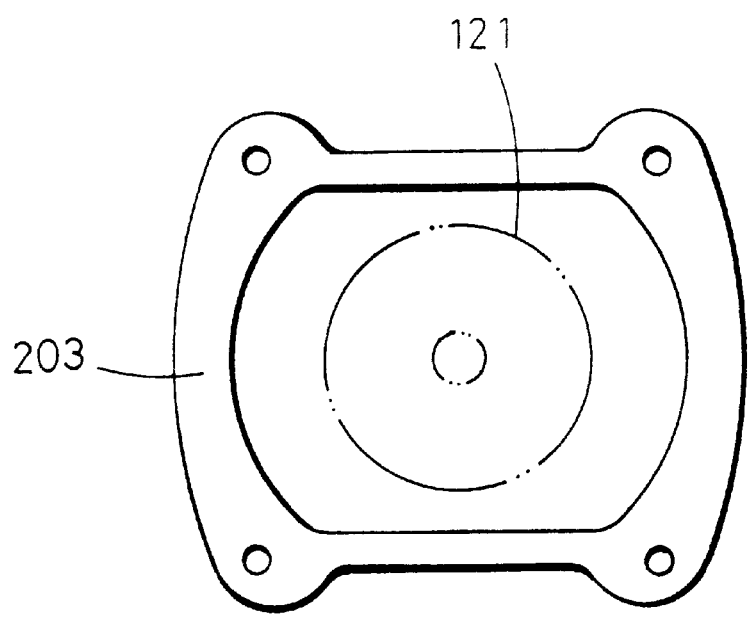
FIG. 67 is the front view of the intermediate magnetic circuit in FIG. 64.

FIG. 65 is the A—A sectional view of FIG. 64. FIG. 66 is the front view of the end shell 204 in FIG. 64, and FIG. 67 is the front view of the intermediate magnetic circuit 203 in FIG. 64. The magnetic field circuit shown in FIGS. 64–67 is formed by the axial lamination of magnetic conductive sheets in an axial direction from the center of the main magnetic field toward the two end shells, wherein each lamination has an increased magnetic conductive area over the preceding lamination, thereby causing the magnetic flux to approach uniformity.

Figure 68:
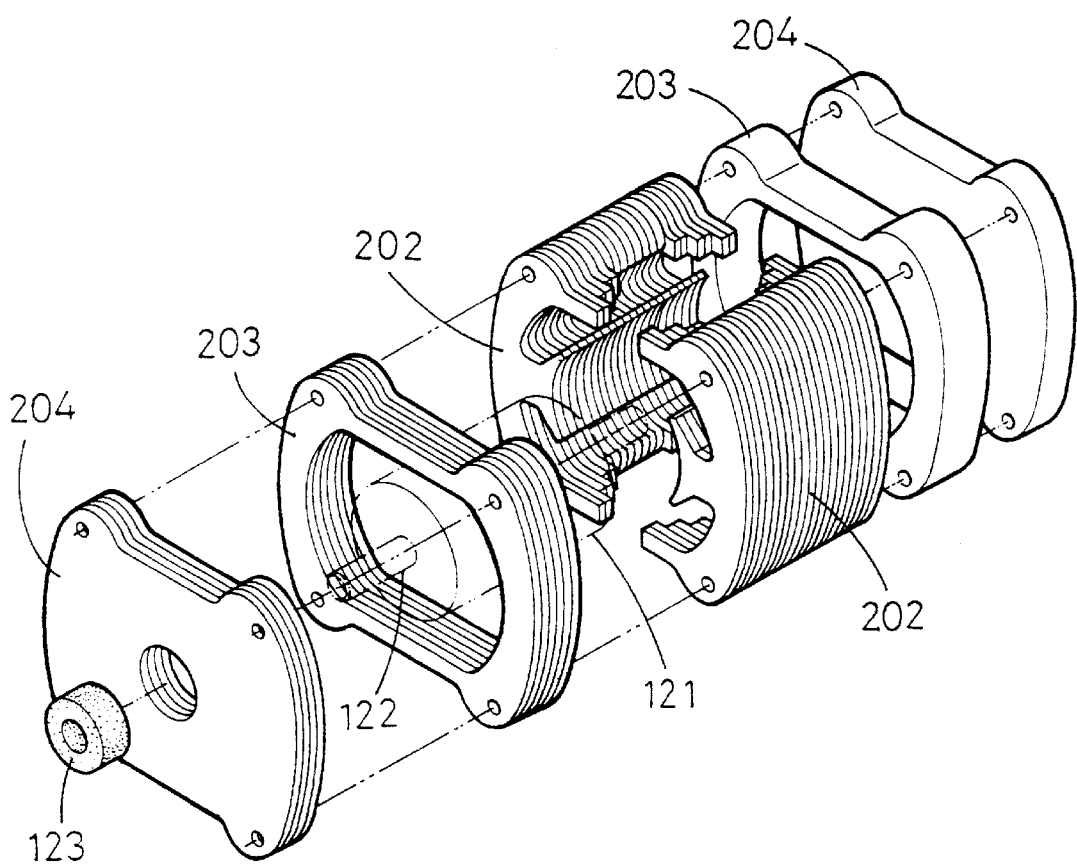
FIG. 68 is an embodying example of the invention illustrating that the gradually widened type magnetic circuit is constituted by the lamination of magnetic conducting sheets in the same diameter but with different widths of magnetic circuits.

FIGS. 65 and 68 show that the electric machine of the present invention has a major width and a minor width. The major width is represented by the right-to-left, largest dimension, and the minor width is represented by the top-to-bottom smallest dimension, both as viewed in FIGS. 65 and 68. FIG. 65 shows succeeding layers of magnetic circuit 201, each having an incrementally increasing major width and uniform minor width.

FIG. 68 is an isometric view of such an electric machine illustrating the gradually widened type magnetic circuit formed by the lamination of magnetic conducting sheets 202, each having gradually widening minor widths in an axial direction from the center of the main magnetic field toward the two end shells 204. FIG. 68 also shows that the center section between the two major poles is open at the minor width. Other than at the center section, the magnetic conducting sheets 202 include a closed magnetic circuit at the minor width which bridges the right-to-left areas as viewed in FIG. 68.

Where the electric machine structure requires a closed magnetic circuit, the two axial ends of the magnetic field circuit in FIGS. 64–68 optionally can be matched with corresponding end shell structures as described below:

FIG. 67 shows an intermediate magnetic circuit 203 used for coupling the two ends of the main magnetic field circuit. Such an arrangement allows the interpole magnetic flux form a closed circuit through the main magnetic circuit, the intermediate magnetic circuit, and the rotor for efficient operation. The intermediate magnetic circuit is formed by the magnetic conductive sheets to present a closed ring-type interpole magnetic circuit at the middle location between the main field poles. The intermediate magnetic circuit can also be constituted by block shaped magnetic conductive material.

FIG. 66 shows an end shell 204, which when combined with the rotor 121 and field magnetic circuit structure (or the series installed intermediate magnetic circuits between the two) to form a mechanical structure to provide the basic mechanical stability for the electric machine operation, wherein the end shell 204 can be a magnetic conductive or non-magnetic conductive body. If non-conductive, a non-magnetic conducting ring 123 is required to be installed between the end shell 204 and the rotating shaft to avoid magnetic flux circulation formation through the rotating shaft when the rotating shaft is a magnetic conductive body. If the rotating shaft is non-magnetic, then the isolating ring can be omitted. The intermediate magnetic circuit 203 must be installed if shell 204 is non-magnetic. Use of circuit 203 is optional if shell 204 is magnetic.

A protective cover can be installed axially or combined with individual arc-shaped or sheet-shaped protective covers, as in example embodiments shown in FIGS. 1–3, to cover the open center structure shown in FIGS. 64–68. The protective cover can optionally be made of magnetic or non-magnetic material, and can optionally be completely closed or have an open, axial cooling flow design utilizing a hole or indent in each intermediate magnetic circuit or end shell. If the protective cover is made of magnetic conducting material, it can become part of the distributed magnetic circuit and may be combined with a commutating magnetic pole, as required.

Figure 69:
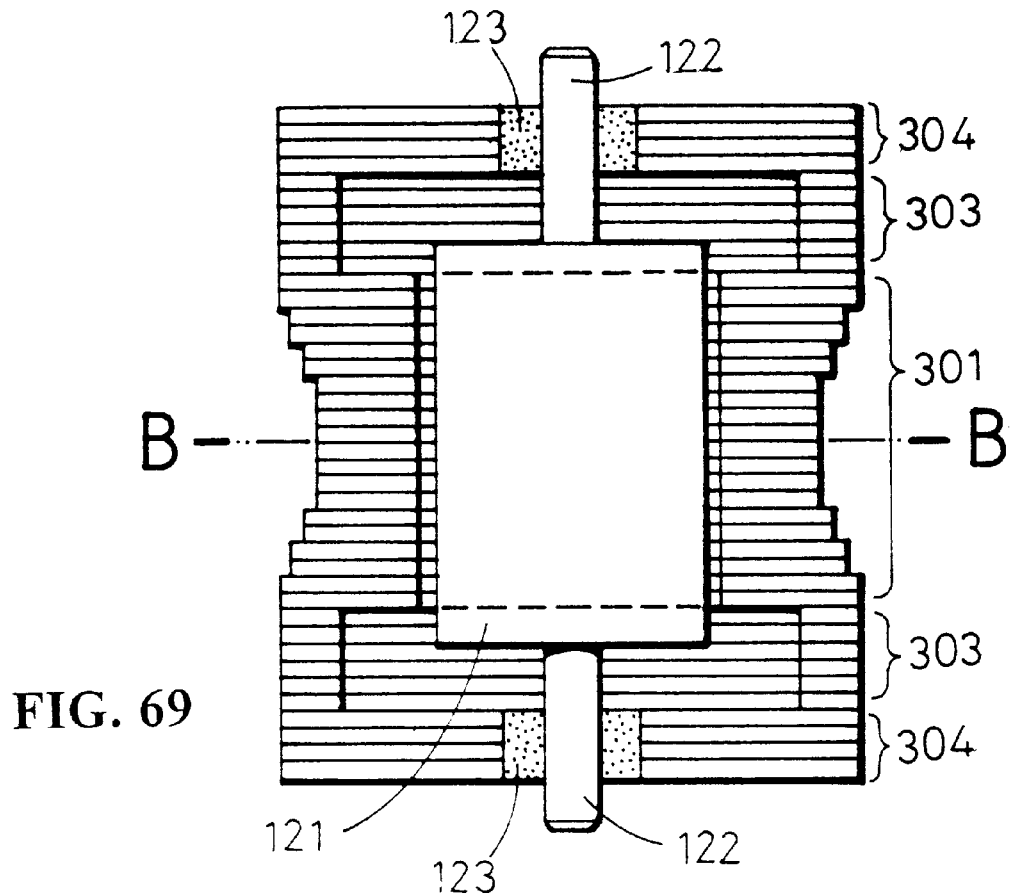
FIG. 69 is a plan sectional view of the embodying example of the invention illustrating that the field magnetic circuits are constituted by axial lamination of the magnetic conducting sheets in different diameters along with the interpole distributed magnetic circuits.
Figure 70:
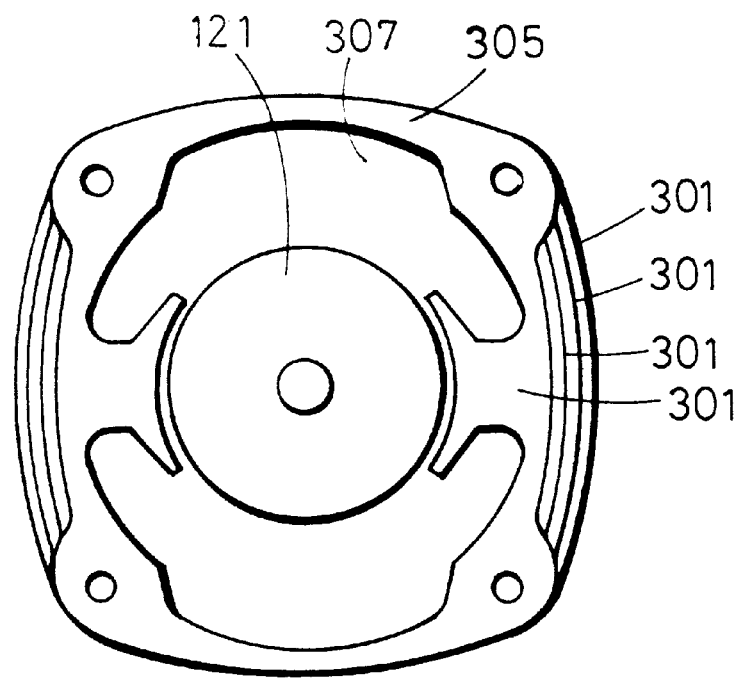
FIG. 70 is the B—B sectional view of FIG. 69.
Figure 71:
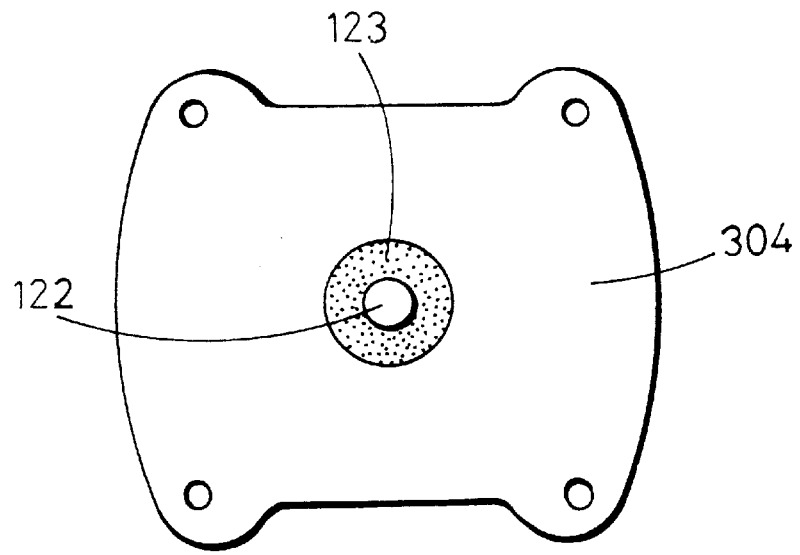
FIG. 71 is the front view of the end shell in FIG. 69.
Figure 72:
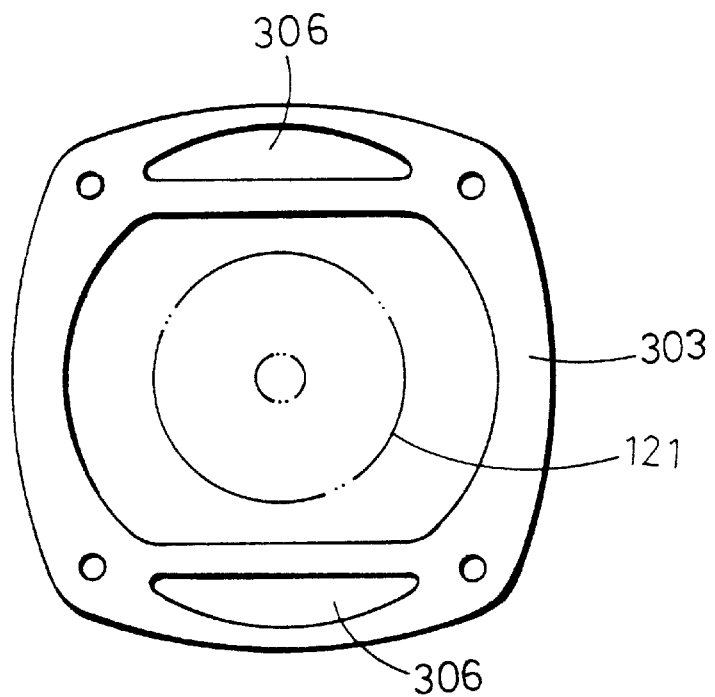
FIG. 72 is the front view of the intermediate magnetic circuit in FIG. 69.

FIGS. 60–72 show a variation on the embodiment described above, and shown in FIGS. 64–67. FIG. 69 is a plan sectional view of the embodiment. FIG. 70 is the B—B sectional view of FIG. 69, and FIG. 72 is the front view of the intermediate magnetic circuit shown in FIG. 69.

Figure 73:
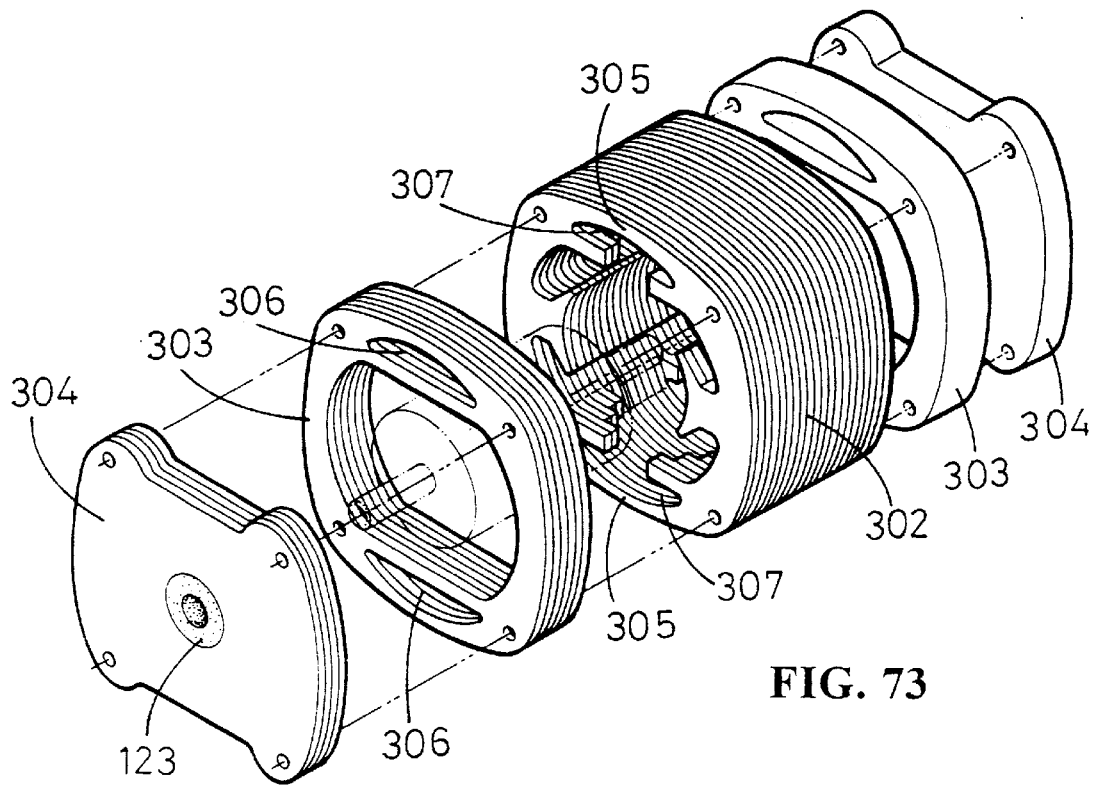
FIG. 73 is an embodying example of the invention illustrating that the magnetic conducting sheets in the same diameter but with different widths of magnetic circuits are axially accumulated to constitute the gradually widened field magnetic circuits along with the ring installation of interpole distributed magnetic circuits.

The magnetic field circuit 301 is similar to circuit 201, except that circuit 301 includes a ring portion 305 installed at the minor width and bridging neighboring major width sides, as shown in FIG. 70. Ring portion 305 is arranged to match the flow circuit hole 306 formed in the magnetic circuit 303, as shown in FIG. 72. As a result, the electric machine of the present invention outwardly appears to be closed radially, but internally having a cooling flow circuit. FIG. 73 is an isometric view of the embodiment shown in FIGS. 69–72. Magnetic circuit element 302 has a gradually increasing magnetic conducting area, like element 202, and includes ring 305 which forms opening 307, which in turn aligns with opening 306, thereby providing internal ventilation while also causing the magnetic flux to approach uniformity. In addition, the two axial ends 304, corresponding to ends 204, can be added to complete the magnetic circuit.

Figure 74:
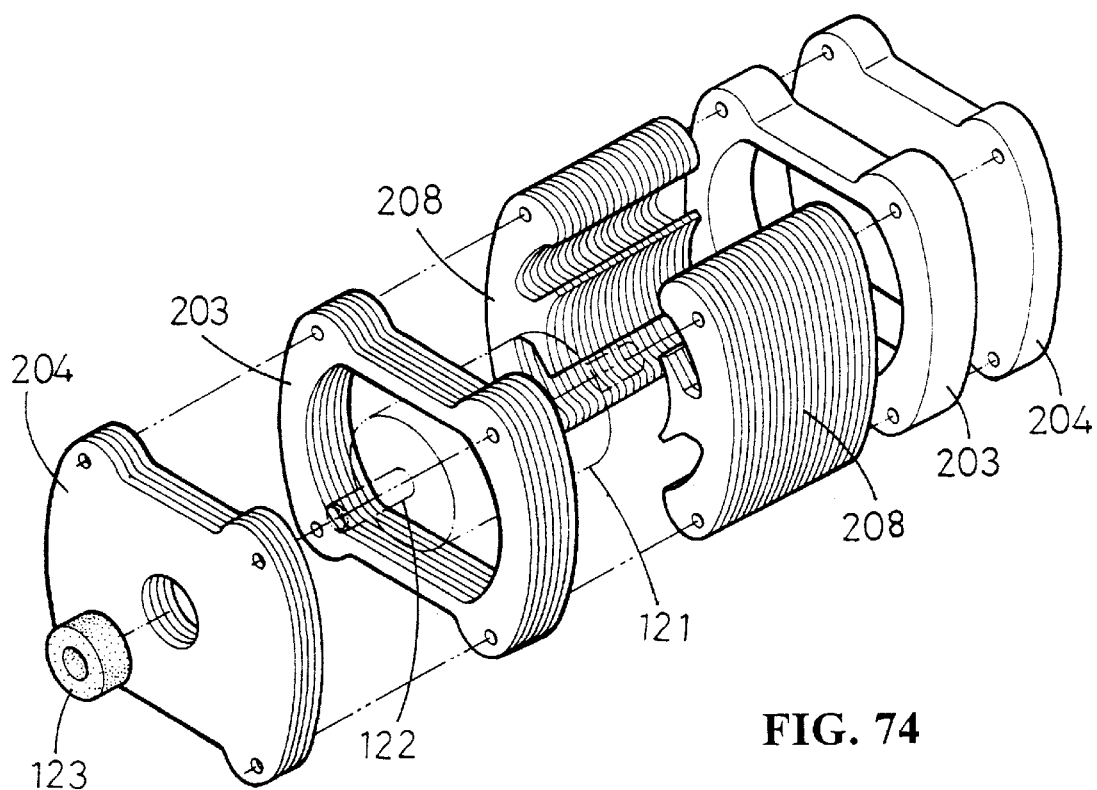
FIG. 74 is the embodying example of the invention illustrating that the magnetic circuit is constituted by lamination of magnetic conducting sheets in the same size.
Figure 75:
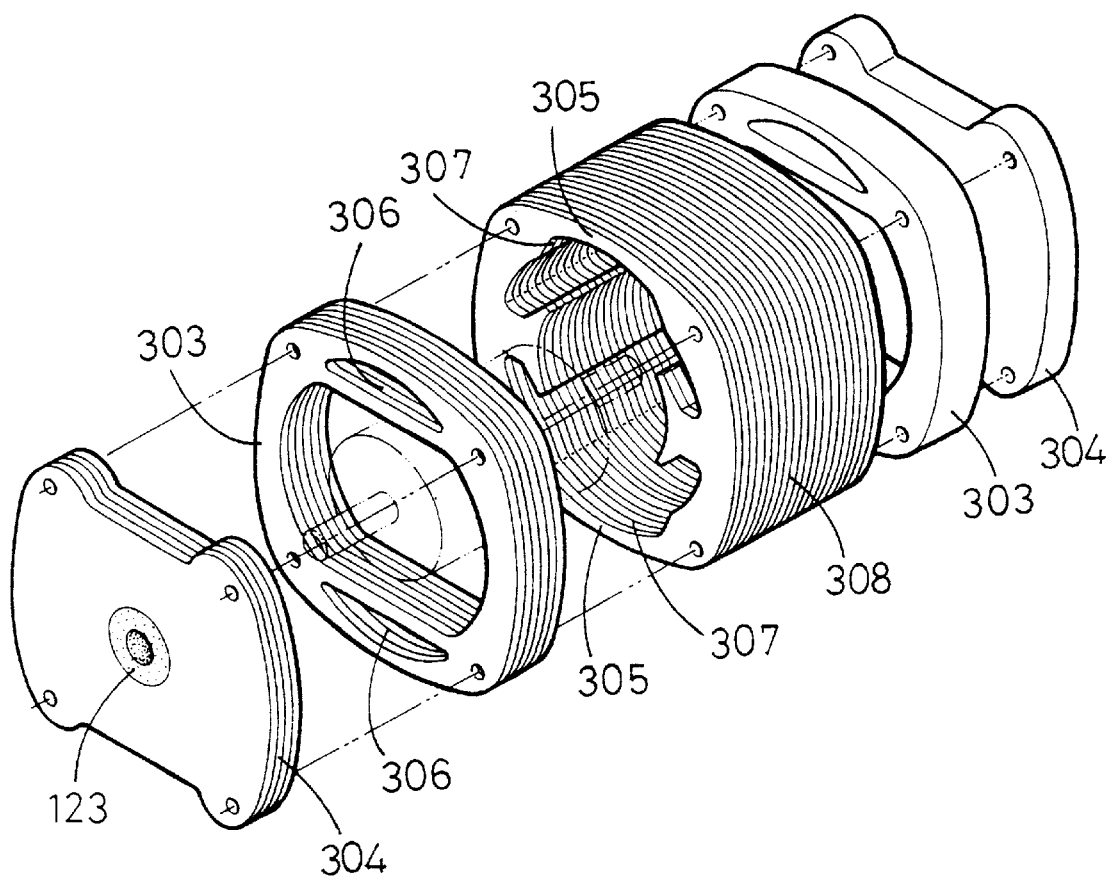
FIG. 75 is the embodying example of the invention illustrating the field magnetic circuit is constituted by laminations of magnetic conducting sheets in the same size along with the ring installation of interpole distributed magnetic circuits.

FIG. 74 is an isometric view of the embodiment of the present invention shown in FIGS. 64–67, including the magnetic circuit element 203, end shell 204, and axially cooling circuit as described above. FIG. 75 is an isometric view of the embodiment of the present invention shown in FIG. 73, however magnetic circuit element 308 replaces element 302 and element 308 is formed of magnetic conducting sheets of the same size.

The magnetic field circuits 74 and 75 can also be formed by combining structures of any of the aforesaid embodiments to form a magnetic conducting area which gradually increases in each longitudinal direction along the pole axis from the center of the magnetic circuit structure to achieve a magnetic field approaching uniformity. Magnetic structures 303 and 304 can be included to complete the magnetic circuit, as described above. Commutating poles and protective covers also can be included as described above.

Any of the above embodiments can be arranged so that its magnetic circuit structure has a gradually increasing magnetic conducting cross-sectional area which increases in an axial direction from one end to the other of the electric machine, thereby causing the magnetic flux at each section of the magnetic circuit to approach uniformity.

Due to the particular structural properties of the air passages, the cooling methods of the present invention include 1) air cooling due to open air cooling, i.e., without a peripheral protective cover, the semi-open type, or the closed type; 2) air cooling by internally installed air fan or externally installed, independently driven air fan; and 3) fluid cooling by externally installed fluid pumps and radiators or heat pipes to dissipate heat.

While many of the elements constituting the invention have been described in accordance with their preferred embodiments, it is to be understood that the invention can be embodied in various ways. Where elements have been described as a solid, single piece, it is possible to produce such an element in multiple pieces connected together by appropriate devices. The various dimensional relationships described could be varied by a person skilled in the art without departing from the scope of the invention. Accordingly, the illustrated embodiments are intended to be exemplary only and not limiting in any manner. It will be envisioned that various substitutions and modifications of the preferred embodiment illustrated in the drawings and described above can be made without departing from the invention as defined in the claims. It will be understood that persons skilled in the art will envision various substitutions of functionally equivalent structure for the structural elements described without departing from the invention.

I claim:

1. A low reactivity magnetic circuit structure for a DC electric machine, comprising:

a rotor;

a magnetic circuit shell, said magnetic circuit shell having a longitudinal dimension, said rotor rotating within said shell about a rotational axis extending between ends of the magnetic circuit shell parallel to the longitudinal dimension, said magnetic circuit shell including a plurality of magnetic circuit structures, said plurality of magnetic circuit structures magnetically interconnecting magnetic pole structures of different polarities to provide a magnetic flux path therebetween, wherein said magnetic circuit structures each have a cross-sectional area extending parallel to said longitudinal direction, a shape of said cross-sectional area being defined by an approximate average of magnetic flux density conducted through each magnetic circuit structure, the cross-sectional area of each magnetic circuit structure is arranged to gradually increase in a longitudinal direction parallel to the longitudinal direction towards said ends of the magnetic circuit shell so as to maintain a substantially uniform distribution of flux through said cross-sectional area, whereby the combination of said magnetic circuit structures achieves an interference-free magnetic flux circuit of at least two magnetic poles by utilizing high magnetic resistance to inhibit cross magnetic flux associated with an armature of the electrical machine.

2. A magnetic circuit structure as claimed in claim 1, wherein each of said magnetic pole structures is a permanent magnet.

3. A magnetic circuit structure as claimed in claim 1, wherein each of said magnetic pole structures is an excited winding iron core.

4. A magnetic circuit structure as claimed in claim 1, wherein said cross-sectional areas of said magnetic circuit structures are defined by a plurality of apertures in the outer periphery of said magnetic circuit shell, each said aperture being disposed between said magnetic pole structures.

5. A magnetic circuit structure as claimed in claim 4, wherein said each aperture is a through-hole.

6. A magnetic circuit structure as claimed in claim 4, wherein said each aperture is elongated, has a maximum central transverse dimension defined to be perpendicular to said longitudinal dimension and is defined by side edges tapering toward opposed end walls, said walls being shorter than said central transverse dimension.

7. A magnetic circuit structure as claimed in claim 4, wherein each of said plurality of apertures is a blind hole opening into an interior of the magnetic circuit shell.

8. A magnetic circuit structure as claimed in claim 4, wherein each of said plurality of apertures is a blind hole opening into an exterior of the magnetic circuit shell.

9. A magnetic circuit structure as claimed in claim 4, wherein each of said plurality of apertures is a blind hole opening into an interior and opening into an exterior of the magnetic circuit shell.

10. A magnetic circuit structure as claimed in claim 4, wherein each of said plurality of apertures is a longitudinal slot arranged parallel to said magnetic field axis.

11. A magnetic circuit structure as claimed in claim 4, wherein each of said plurality of apertures is a longitudinal slot arranged to be slanted toward said magnetic field axis.

12. A magnetic circuit structure as claimed in claim 4, wherein each of said plurality of apertures is a lateral slot arranged to be perpendicular to the magnetic field axis.

13. A magnetic circuit structure as claimed in claim 4, wherein each of said plurality of apertures is a round aperture.

14. A magnetic circuit structure as claimed in claim 4, wherein said plurality of apertures is a combination selected from the group consisting of round apertures, apertures slotted perpendicular to the magnetic field axis, and apertures slanted toward the magnetic field axis.

15. A magnetic circuit structure as claimed in claim 4, further comprising a plurality of protective covers mounted on the outer periphery of the magnetic shell so that each of said plurality of protective covers an associated aperture, wherein said plurality of protective covers are made of magnetic conducting material, and wherein air passages are formed between the protective covers and the magnetic shell to provide cooling air flow.

16. A magnetic circuit structure as claimed in claim 15, wherein said protective covers are made of non-magnetic conducting material.

17. A magnetic circuit structure as claimed in claim 1, further comprising a protective cover arranged to entirely cover said magnetic circuit shell including all said apertures, said protective cover being made of non-magnetic conducting material and spaced from said magnetic circuit shell to provide cooling air flow.

18. A magnetic circuit structure as claimed in claim 15, wherein said magnetic circuit shell further comprises:

two end shell sections, each of said two shell sections corresponding to a respective magnetic field pole;

said end shell sections and said magnetic circuit structures having a shape arranged to maintain approximately uniform distribution of magnetic flux through said magnetic circuit structure cross-sectional area;

said each section having a plurality of indents and a plurality of said apertures; and said indents including a high-efficiency heat conductor.

19. A magnetic circuit structure as claimed in claim 18, wherein said indents are partially open.

20. A magnetic circuit structure as claimed in claim 18, wherein said magnetic circuit shell further comprises:

a plurality of interpole auxiliary distributing magnetic circuit components, wherein said end shell sections are combined with at least one of said interpole auxiliary distributing magnetic circuit components so as to form magnetic circuits connecting magnetic field poles of said DC electric machine.

21. A magnetic circuit structure as claimed in claim 20, wherein said interpole auxiliary distributing magnetic circuit component is a lateral strap.

22. A magnetic circuit structure as claimed in claim 20, wherein said interpole auxiliary distributing magnetic circuit component is an axial strap.

23. A magnetic circuit structure as claimed in claim 20, wherein said interpole auxiliary distributing magnetic circuit component is a diagonal strap.

24. A magnetic circuit structure as claimed in claim 20, wherein said structure is a linear electric machine structure, wherein said structure is an extension of a multi-pole and large diameter rotational devices.

* * * * *